(12) United States Patent
Wakabayashi

(10) Patent No.: US 12,267,633 B2
(45) Date of Patent: Apr. 1, 2025

(54) PROJECTOR

(71) Applicant: SEIKO EPSON CORPORATION, Tokyo (JP)

(72) Inventor: Shinichi Wakabayashi, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/522,488

(22) Filed: Nov. 29, 2023

(65) Prior Publication Data
US 2024/0179278 A1   May 30, 2024

(30) Foreign Application Priority Data
Nov. 29, 2022   (JP) .................. 2022-190075

(51) Int. Cl.
| | |
|---|---|
| *G09G 3/36* | (2006.01) |
| *G02B 26/08* | (2006.01) |
| *G02B 27/10* | (2006.01) |
| *G03B 21/14* | (2006.01) |
| *H04N 9/31* | (2006.01) |
| *G02B 27/14* | (2006.01) |

(52) U.S. Cl.
CPC ....... *H04N 9/3155* (2013.01); *G02B 26/0875* (2013.01); *G02B 27/1046* (2013.01); *G03B 21/142* (2013.01); *G03B 21/147* (2013.01); *G02B 27/141* (2013.01)

(58) Field of Classification Search
CPC .............. H04N 9/3155; G02B 26/0875; G02B 27/1046; G02B 27/141; G03B 21/142; G03B 21/147

USPC .......................................... 345/87
See application file for complete search history.

(56) References Cited

U.S. PATENT DOCUMENTS

| | | | |
|---|---|---|---|
| 2005/0078278 A1* | 4/2005 | Uehara | G02B 27/283 |
| | | | 348/E9.027 |
| 2019/0049824 A1* | 2/2019 | Yamamoto | G02B 5/3025 |
| 2019/0066553 A1* | 2/2019 | Ohkoba | G09G 3/007 |
| 2020/0159094 A1* | 5/2020 | Wakabayashi | H02K 33/16 |
| 2020/0174246 A1* | 6/2020 | Wakabayashi | G03B 21/006 |
| 2021/0294094 A1 | 9/2021 | Wakabayashi et al. | |

FOREIGN PATENT DOCUMENTS

JP   2021-148890 A   9/2021

* cited by examiner

*Primary Examiner* — Jennifer T Nguyen
(74) *Attorney, Agent, or Firm* — Dority & Manning, P.A.

(57) ABSTRACT

A projector according to an aspect of the present disclosure includes a light modulation section that has a pixel region containing a plurality of unit pixels segmented by a black matrix, a projection system, and a pixel shifting device that shifts the optical path of image light output from the light modulation section. One of the plurality of unit pixels in the pixel region is set as a reference unit t pixel, and the pixel shifting device superimposes the image light output from the reference unit pixel at a shifted display position on the region corresponding to the black matrix and surrounding the reference unit pixel at a reference display position in such a way that the image light does not overlap with other unit pixels adjacent to the reference unit pixel out of the unit pixels.

11 Claims, 11 Drawing Sheets

PROJECTOR

The present application is based on, and claims priority from JP Application Serial Number 2022-190075, filed Nov. 29, 2022, the disclosure of which is hereby incorporated by reference herein in its entirety.

BACKGROUND

1. Technical Field

The present disclosure relates to a projector.

2. Related Art

To make the resolution of a projected image higher in a pseudo manner than the resolution of a light modulator, such as a liquid crystal panel, there has been a known projector having a configuration in which the optical path of the light output from the light modulator is shifted. JP-A-2021-148890 discloses a projector including a light source, a light modulator formed of three liquid crystal display elements, an optical device that shifts the optical path of image light, and a projection lens.

JP-A-2021-148890 is an example of the related art.

Since a projector generally enlarges an image and projects the enlarged image, an inter-pixel portion located between a plurality of pixels that constitute the image tends to be recognized. In the projector described above, when the resolution is increased in a pseudo manner, color light from a pixel is mixed with light having different color from an adjacent pixel so that color mixture occurs, which reduces the color purity of the image. It is therefore desired to provide a novel technology that can make the inter-pixel portion of the displayed image to be unlikely to be recognized while suppressing the color mixture in the displayed image having been enlarged and projected.

SUMMARY

According to an aspect of the present disclosure, there is provided a projector including a light source, a light modulation section that has a pixel region containing a plurality of unit pixels segmented by a black matrix and modulates light incident from the light source to generate image light, a projection system that projects the image light output from the light modulation section onto a projection receiving surface, and a pixel shifting device that is disposed between the light modulation section and the projection system and shifts an optical path of the image light output from the light modulation section. One of the plurality of unit pixels in the pixel region is set as a reference unit pixel, and the pixel shifting device positions the image light before the optical path is shifted at a reference display position on the projection receiving surface, positions the image light after the optical path is shifted at a shifted display position on the projection receiving surface, and superimposes the image light output from the reference unit pixel at the shifted display position on a region corresponding to the black matrix and surrounding the reference unit pixel at the reference display position in such a way that the image light does not overlap with other unit pixels adjacent to the reference unit pixel out of the unit pixels.

DESCRIPTION OF EMBODIMENTS

Figure 1:
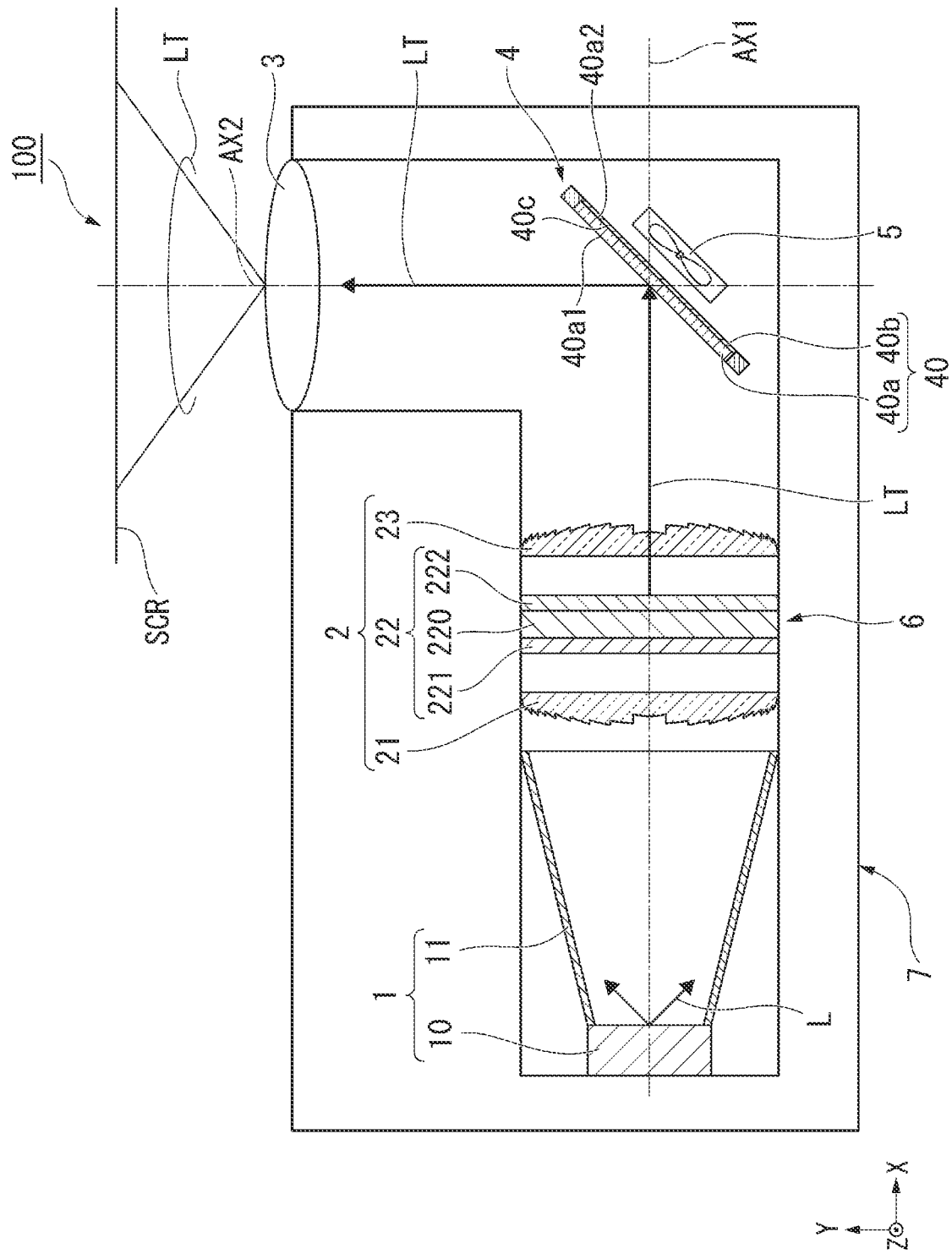
FIG. 1 shows a schematic configuration of a projector according to a first embodiment.

Embodiments of the present disclosure will be described below in detail with reference to the drawings. In the drawings used in the description below, a characteristic portion is enlarged for convenience in some cases for clarity of the characteristic thereof, and the dimension ratio and other factors of each component are therefore not always equal to actual values.

First Embodiment

FIG. 1 shows a schematic configuration of a projector 100 according to the present embodiment.

The projector 100 according to the present embodiment is a projection-type image display apparatus that displays a color image on a screen SCR, which is a projection receiving surface, as shown in FIG. 1.

The projector 100 includes a light source unit 1, an image generator 2, a projection system 3, a pixel shifting device 4, a fan 5, an inner enclosure 6, and an exterior enclosure 7.

In the following description, an XYZ coordinate system shown in FIG. 1 is used in some cases to describe the arrangement of the members described above. In FIG. 1, the axis X is an axis extending along a first optical axis AX1, which is a first reference axis along which some of the optical parts in the projector 100 are arranged. The axis Y is perpendicular to the axis X, is an axis extending along a second optical axis AX2, which is a second reference axis along which some of the other optical parts in the projector 100 are arranged, and is an axis extending along the direction in which image light LT is projected onto the screen SCR. The axis Z is an axis perpendicular to the axes X and Y and extending along the upward-downward direction of the projector 100.

In the present embodiment, for example, the opposite directions along the axis Z are collectively referred to as an "upward-downward direction Z" in the projector 100; the direction toward the positive end of the direction Z is referred to as an "upper side", and the direction toward the negative end of the direction Z is referred to as a "lower side". The opposite directions along the axis X are collectively referred to as a "rightward-leftward direction X" in the projector 100; the direction toward the positive end of the direction X is referred to as a "right side", and the direction toward the negative end of the direction X is referred to as a "left side". The opposite directions along the axis Y are collectively referred to as a "frontward-rearward direction Y" in the projector 100; the direction toward the positive end of the direction Y is referred to as a "front side", and the direction toward the negative end of the direction Y is referred to as a "rear side".

The upward-downward direction Z, the rightward-leftward direction X, and the frontward-rearward direction Y are merely names for illustrating the arrangement of the component of the projector 100, and do not specify the actual installation postures or orientations of the component in the projector 100.

The inner enclosure 6 fixes the light source unit 1, the image generator 2, the projection system 3, the pixel shifting device 4, and the fan 5 thereto. The light source unit 1, the image generator 2, and the pixel shifting device 4 are arranged along the first optical axis AX1 in the inner enclosure 6. The pixel shifting device 4 and the projection system 3 are arranged along the second optical axis AX2 in the inner enclosure 6.

The projector 100 according to the present embodiment, in which the constituent parts thereof are fixed to the inner enclosure 6, is easy to assemble. The exterior enclosure 7 has the shape of a substantially cuboidal box formed of a plurality of walls, and constitutes the exterior of the projector 100.

The light source unit 1 is formed of a light source 10 and a reflector 11.

The light source 10 outputs white light L. The light source 10 in the present embodiment is formed, for example, of a light emitting diode (LED). The projector 100 according to the present embodiment uses an LED as the light source 10 to reduce the size and weight of the light source unit 1.

The reflector 11 is provided at the light exiting side of the light source 10. The reflector 11 reflects the white light L output from the light source 10 at a large angle of radiation to cause the white light L to enter the image generator 2.

The image generator 2 includes a first Fresnel lens 21, a light modulation section 22, and a second Fresnel lens 23.

The first Fresnel lens 21 is disposed at the light incident side of the light modulation section 22, parallelizes the white light L output from the light source unit 1, and causes the parallelized white light L to enter the light modulation section 22. The first Fresnel lens 21 functions as a convex lens having positive power.

The image generator 2 in the present embodiment uses the first Fresnel lens 21 as the parallelizing lens to reduce the dimension of the projector 100 in the rightward-leftward direction X along the first optical axis AX1.

The light modulation section 22 is formed of a transmissive liquid crystal panel 220. The liquid crystal panel 220 includes a color filter and modulates the white light L from the light source 10 in accordance with image information to generate full-color image light LT. The light modulation section 22 further includes a light-incident-side polarizer 221 provided at the light incident side of the liquid crystal panel 220 and a light-exiting-side polarizer 222 provided at the light exiting side of the liquid crystal panel 220. The light-incident-side polarizer 221 and the light-exiting-side polarizer 222 are so arranged that the polarization axes thereof are perpendicular to each other.

The projector 100 according to the present embodiment employs a single-panel scheme using the single liquid crystal panel 220 to reduce the size of the configuration of the projector 100.

The second Fresnel lens 23 is disposed at the light exiting side of the light modulation section 22. The second Fresnel lens 23 functions as a convex lens having positive power, and causes the image light LT output from the light-exiting-side polarizer 222 of the liquid crystal panel 220 to converge.

The image generator 2 in the present embodiment uses the second Fresnel lens 23 as the lens that causes light to converge to reduce the dimension of the projector 100 in the rightward-leftward direction X along the first optical axis AX1.

In the projector 100 according to the present embodiment, the pixel shifting device 4 is disposed between the image generator 2 and the projection system 3. The pixel shifting device 4 includes an optical path changer 40, which changes the optical path of the image light LT output from the liquid crystal panel 220 of the image generator 2, and can continuously shift the optical path of the image light LT.

The pixel shifting device 4 performing no pixel shifting is so disposed in the inner enclosure 6 that the light incident surface of the optical path changer 40 intersects at an angle of 45° with the first optical axis AX1 and the second optical axis AX2. The optical path changer 40 deflects the optical path of the image light LT output from the image generator 2 by 90° and causes the image light LT to enter the projection system 3.

The projector 100 according to the present embodiment can adjust the image display position on the screen SCR, which is the projection receiving surface, by shifting the optical path of the image light LT with the aid of the pixel shifting device 4. The configuration of the pixel shifting device 4 will be described later in detail.

The fan 5 cools at least the pixel shifting device 4. The fan 5 is disposed at the opposite side of the optical path changer 40 of the pixel shifting device 4 from the side toward which the optical path changer 40 outputs the light.

The pixel shifting device 4 generates heat when driven and therefore forms a heat source in the inner enclosure 6. In the projector 100 according to the present embodiment, an increase in the temperature of the pixel shifting device 4 can be suppressed by using the space at the opposite side of the optical path changer 40 from the side toward which the optical path changer 40 outputs the light to cool the pixel shifting device 4. Furthermore, since the fan 5 is not located at the light incident side of the optical path changer 40, the fan 5 can cool the optical path changer 40 without blocking the image light LT.

Note that the light source unit 1, the image generator 2, and the projection system 3 may be cooled by supplying part of the airflow from the fan 5.

Figure 2:
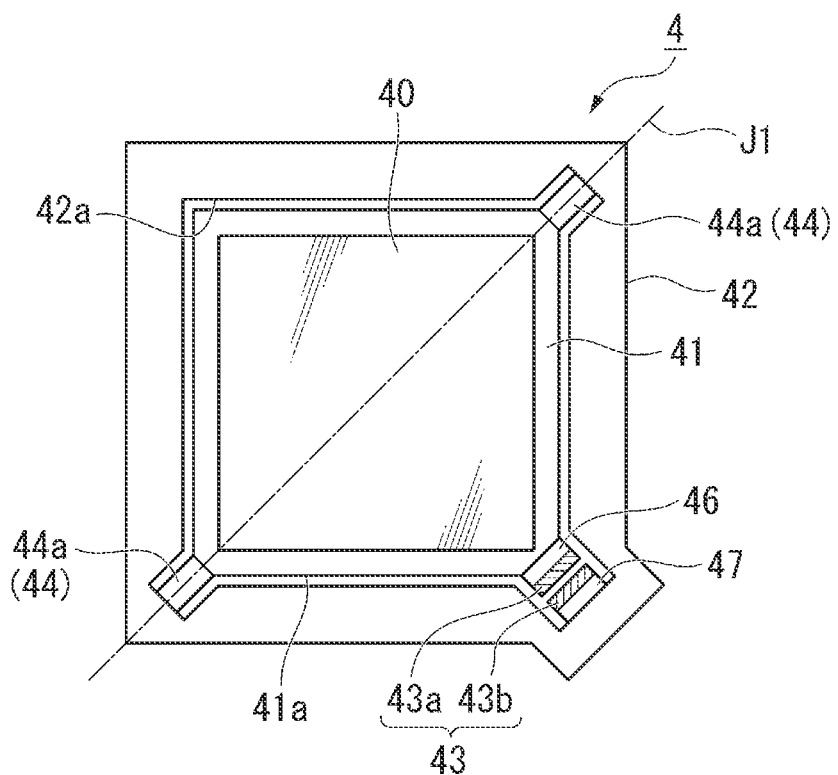
FIG. 2 is a plan view of a pixel shifting device.

The configuration of the pixel shifting device 4 will be subsequently described. FIG. 2 is a plan view of the pixel shifting device 4.

The pixel shifting device 4 includes the optical path changer 40, a first movable section 41, which holds the optical path changer 40, a base 42, which is linked to the first movable section 41 swingably around a first swing axis J1, a first actuator 43, which swings the first movable section 41, and a linkage shaft section 44, as shown in FIG. 2. The pixel shifting device 4 in the present embodiment can shift the optical path of the image light LT by changing the posture of the optical path changer 40.

The optical path changer 40 is an element that changes the optical path of the image light LT by reflecting the image light LT. The optical path changer 40 is formed of a light transmissive substrate 40a having a surface at which a reflective film 40b is formed. The reflective film 40b is formed at a rear surface 40a2 at the opposite side of the light transmissive substrate 40a from a light incident surface 40a1. The surface of the reflective film 40b where the reflective film 40b is in contact with the light transmissive substrate 40a functions as a reflection surface 40c of the optical path changer 40. That is, the optical path changer 40 has the reflection surface 40c, which reflects the image light LT.

The light incident on the optical path changer 40 is refracted at the light incident surface 40a1 of the light transmissive substrate 40a, passes through the light transmissive substrate 40a, is reflected off the reflective film 40b, and is refracted again when exiting out of the light transmissive substrate 40a. The optical path changer 40 shifts the optical path of the image light LT in accordance with the posture of the optical path changer 40 when deflecting the optical path of the image light LT incident from the image generator 2 by 90°. The amount of shift of the optical path of the image light LT is specified in accordance with the degree of the change in the posture of the optical path changer 40.

The light transmissive substrate 40a is formed, for example, of a substantially square white glass plate. Employing a white glass plate having excellent strength increases the rigidity of the optical path changer 40 as a whole and can therefore suppress possible distortion of the optical path changer 40. The reflective film is formed, for example, of a metal film or a dielectric multilayer film.

Note that the material of the light transmissive substrate 40a is not limited to white plate glass, and may be any material having optical transparency and capable of refracting light, such as borosilicate glass, quartz glass, and a variety of other glass materials. The material of the light transmissive substrate 40a may instead be any of a variety of crystal materials, such as crystal quartz and sapphire, or any of a variety of resin materials, such as polycarbonate-based resin and acrylic resin. The optical path changer 40 does not necessarily have a substantially square shape, and may have a rectangular, rhombic, or elliptical shape.

The first movable section 41 is a frame-shaped holding frame made of metal, and is disposed around the optical path changer 40. The first movable section 41 supports the outer circumferential edge of the optical path changer 40 to accommodate the optical path changer 40 with the front and rear surfaces thereof exposed. The first movable section 41 is made, for example, of stainless steel. The optical path changer 40 is fixed to the first movable section 41 with an adhesive. Note that the first movable section 41 is not limited to a frame-shaped section, and may be any member that supports at least part of the optical path changer 40.

The base 42 is a frame-shaped support member that is made of resin, is one size larger than the first movable section 41, and is disposed around the first movable section 41. The base 42 has a base inner side surface 42a, which is a frame-shaped side surface and surrounds an outer side surface 41a of the first movable section 41. The base 42 is fixed to the inner enclosure 6.

The linkage shaft section 44 is formed of a pair of shaft sections 44a, which swingably link the outer side surface 41a of the first movable section 41 to the base inner side surface 42a of the base 42.

The pair of shaft sections 44a are provided so as to protrude from a pair of corner portions that form the outer side surface 41a of the first movable section 41, which has a rectangular frame shape, and are located on a diagonal line of the rectangular frame shape, and the pair of shaft sections 44a link the outer side surface 41a of the first movable section 41 to the base inner side surface 42a of the base 42.

The pair of shaft sections 44a are linked to portions that form the base inner side surface 42a, which has a rectangular frame shape, and are located on one diagonal line of the rectangular frame shape. The first swing axis J1 of the first movable section 41 is an imaginary axis extending along the pair of shaft sections 44a, and the first swing axis J1 passes through the center of the optical path changer 40 supported by the first movable section 41.

The first movable section 41, which holds the optical path changer 40, has diagonal portions located on the diagonal line perpendicular to the first swing axis J1 and swingable around the first swing axis J1 because the pair of shaft sections 44a located at opposite ends of the first movable section 41 in the direction along the first swing axis J1 are fixed to the base 42.

The optical path changer 40 is therefore rotatable along with the first movable section 41 relative to the base 42 around the first swing axis J1, so that the posture of the optical path changer 40 can be changed.

The first actuator 43 includes a first magnet 43a, which is disposed at the outer side surface 41a of the first movable section 41, and a first coil 43b, which is disposed at the base inner side surface 42a of the base 42 and faces the first magnet 43a, in a direction intersecting with the first swing axis J1.

Specifically, the first magnet 43a is provided at one corner portion that forms the outer side surface 41a of the first movable section 41 and is located on the other diagonal line where the shaft sections 44a are not provided. The first coil 43b is located at a portion that forms the base inner side surface 42a, is located on the diagonal line perpendicular to the first swing axis J1, and faces the first magnet 43a.

As described above, the first magnet 43a and the first coil 43b, which constitute the first actuator 43, are disposed at portions that form the outer side surface 41a of the first movable section 41 and the base inner side surface 42a of the base 42 and are located at one end of the diagonal line perpendicular to the first swing axis J1.

The first magnet 43a is disposed at the outer side surface 41a of the first movable section 41 via a magnet frame 46. The magnet frame 46 is made of metal, such as iron, and functions as a back yoke. The first magnet 43a may be a neodymium magnet or a permanent magnet producing a predetermined magnetic force, such as a samarium-cobalt magnet, a ferrite magnet, and an alnico magnet.

The first coil 43b is disposed at the base inner side surface 42a of the base 42 via a coil frame 47. The coil frame 47 is so fixed to the base inner side surface 42a that the first coil 43b faces the first magnet 43a with a gap therebetween. The coil frame 47 is made of metal, such as iron, and functions as a back yoke. The first coil 43b is formed of a coil wire wound around the coil frame 47.

Note that the positions of the first magnet 43a and the first coil 43b may be swapped, that is, the first magnet 43a may be disposed at the base inner side surface 42a of the base 42, and the first coil 43b may be disposed at the outer side surface 41a of the first movable section 41. That is, the first magnet 43a only needs to be disposed at one of the outer side surface 41a of the first movable section 41 and the base inner side surface 42a of the base 42, and the first coil 43b only needs to be disposed at the other one of the outer side surface 41a of the first movable section 41 and the base inner side surface 42a of the base 42.

The first actuator 43 produces a force acting between the first magnet 43a and the first coil 43b in a direction that intersects with the first swing axis J1 by energizing the first coil 43b to produce a magnetic field that causes the first coil 43b and the first magnet 43a to repel or attract each other. Since the pair of shaft sections 44a, which are located at opposite ends of the first movable section 41 in the direction along the first swing axis J1, are fixed to the base 42 as described above, the portion of the first movable section 41 that is provided with the first magnet 43a swings around the first swing axis J1. The optical path changer 40 fixed to the first movable section 41 therefore swings relative to the base 42 around the first swing axis J1.

Based on the configuration described above, the pixel shifting device 4 in the present embodiment can swing the first movable section 41 around the first swing axis J1 by adjusting the amount of electric power supplied to the first coil 43b to control the posture of the optical path changer 40.

The pixel shifting device 4 can deflect the optical path of the image light LT output from the liquid crystal panel 220 of the image generator 2 by 90° and shift the optical path of the image light LT in the direction perpendicular to the first swing axis J1 by changing the posture of the optical path changer 40.

Since the pixel shifting device 4 in the present embodiment employs the configuration in which the first movable section 41 and the base 42 are disposed around the optical path changer 40, the dimension of the optical path changer 40 in the thickness direction can be reduced.

The projection system 3 enlarges the image light LT output from the liquid crystal panel 220 of the image generator 2 and projects the enlarged image light LT onto the screen SCR, which is the projection surface. An enlarged color image is thus displayed on the screen SCR. The image displayed on the screen SCR is the image of a pixel region GA of the liquid crystal panel 220.

Figure 3:
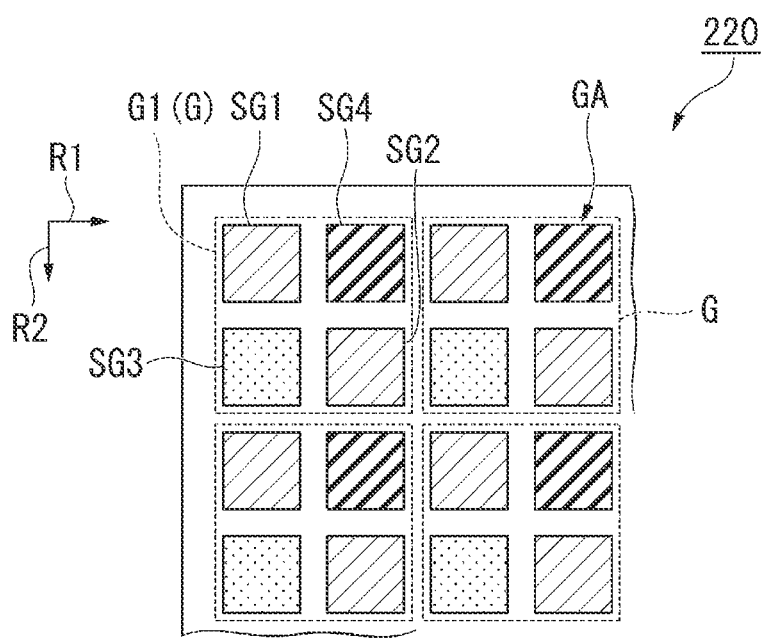
FIG. 3 is a plan view showing the structure of the pixels of a liquid crystal panel.

The structure of the pixels of the liquid crystal panel 220 will now be described. FIG. 3 is a plan view showing the structure of the pixels of the liquid crystal panel 220.

The liquid crystal panel 220 has the pixel region GA including a plurality of pixels G, as shown in FIG. 3. In the pixel region GA, the plurality of pixels G are arranged in a matrix in a row direction R1 and a column direction R2 perpendicular to each other. The pixels G are each formed of four sub-pixels SG1, SG2, SG3, and SG4, which are diagonally disposed and form two sub-pixel pairs that intersect with each other. The sub-pixels SG1, SG2, SG3, and SG4 are segmented by a black matrix BM. The black matrix BM is wiring lines that are disposed between the sub-pixels and drive the sub-pixels, or a light shielding member that covers the wiring lines and segments the sub-pixels.

The pixel region GA of the liquid crystal panel 220 contains the plurality of sub-pixels SG1, SG2, SG3, and SG4 segmented by the black matrix BM. In the present embodiment, a "unit pixel" in the claims means a pixel in the smallest unit segmented by the black matrix BM in the pixel region GA. In the embodiment, the sub-pixels SG1, SG2, SG3, and SG4 are each the smallest unit in the pixel region GA and corresponds to the "unit pixel" in the claims.

Specifically, the sub-pixels SG1 and SG2 are disposed on one diagonal line of the pixel G, which has a substantially square shape, and the sub-pixels SG3 and SG4 are disposed on the other diagonal line of the pixel G. The sub-pixels SG1 and SG3 are sequentially arranged in the column direction R2, and the sub-pixels SG4 and SG2 are sequentially arranged in the column direction R2. In the present embodiment, the sub-pixels SG1 and SG2 generate green image light LT, the sub-pixel SG3 generates red image light LT, and the sub-pixel SG4 generates blue image light LT.

In the liquid crystal panel 220 in the present embodiment, the plurality of pixels G include a first pixel G1. The first pixel G1 is located in the first row and in the first column among the plurality of pixels G in the pixel region GA.

An image displayed on the screen SCR by the image light output from the liquid crystal panel 220 having the configuration shown in FIG. 3 has a pixel structure corresponding to the pixel region GA of the liquid crystal panel 220. Specifically, the image displayed on the screen SCR is formed of a plurality of pixels, which are each formed of four sub-pixels.

Since a projector generally enlarges an image and projects the enlarged image onto a screen, a non-display region located between the pixels of the displayed image is likely to be visually recognized. The non-display region of the displayed image is the region that corresponds to the black matrix and segments the pixels of the pixel region of the liquid crystal panel.

The projector 100 according to the present embodiment can display a high-quality image by shifting the optical path of the image light LT with the aid of the pixel shifting device 4 so that the non-display region located between the pixels of an image displayed on the screen SCR is unlikely to be visually recognized.

Figure 4:
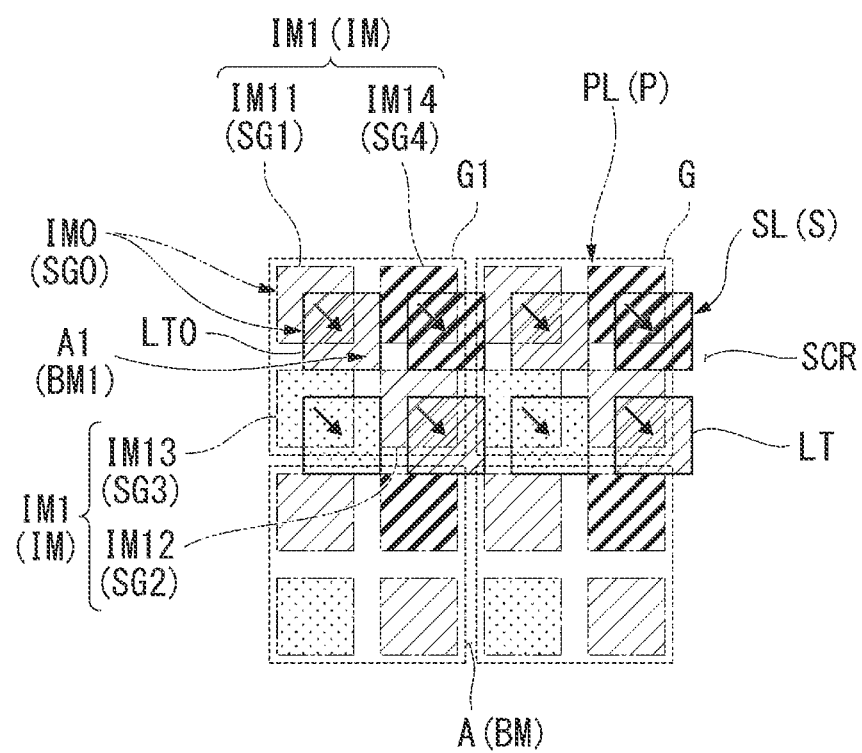
FIG. 4 describes how the pixel shifting device achieves increased image quality.

The principle of an increase in the quality of a displayed image achieved by the pixel shifting device 4 will be described below. FIG. 4 describes how the pixel shifting device 4 achieves the increased image quality. FIG. 4 shows key portions of an image having undergone the pixel shifting and displayed on the screen SCR.

In the present specification, the optical path of the image light LT output from the optical path changer 40 in the case where the pixel shifting device 4 does not perform the pixel shifting is referred to as a reference optical path, and the optical path of the image light LT output from the optical path changer 40 in the case where the pixel shifting device 4 performs the pixel shifting is referred to as a shifted optical path.

Furthermore, the position where the image light LT traveling along the reference optical path displays an image on the screen SCR is referred to as a "reference display position", and the position where the image light LT traveling along the shifted optical path displays an image on the screen SCR is referred to as a "shifted display position". In FIG. 4, the reference optical path is labeled with a reference character PL, the shifted optical path is labeled with a reference character SL, the reference display position is labeled with a reference character P, and the shifted display position is labeled with a reference character S. An image displayed on the screen SCR by the image light LT output from the liquid crystal panel 220 is referred to as a "displayed image", and the displayed image is labeled with a reference character IM in FIG. 4.

When the pixel shifting device 4 swings the optical path changer 40 around the first swing axis J1, as shown in FIG. 2, the optical path of the image light LT output from each of the sub-pixels of the liquid crystal panel 220 is shifted. At this point of time, the optical path of the image light LT output from each of the sub-pixels of each of the pixels G of the liquid crystal panel 220 is shifted from the reference optical path PL to the shifted optical path SL or vice versa, and the position where the displayed image IM is displayed on the screen SCR is successively switched between the reference display position P and the shifted display position S, as shown in FIG. 4.

The pixel shifting device 4 in the present embodiment positions the image light LT traveling along the reference optical path at the reference display position P on the screen SCR when the pixel shifting is not performed, and positions the image light LT traveling along the shifted optical path at the shifted display position S on the screen SCR when the pixel shifting is performed, as shown in FIG. 4.

The displayed image IM on the screen SCR has the same pixel structure as that of the pixel region GA of the liquid crystal panel 220, as described above. The displayed image IM therefore includes a plurality of pixels, which are each formed of four sub-pixels.

Hereinafter, the pixels that constitute a displayed image on the screen SCR are referred to as "displayed pixels", and the sub-pixels that constitute each of the pixels of the displayed image on the screen SCR are referred to as "displayed sub-pixels".

In FIG. 4, out of the plurality of displayed pixels, which constitute the displayed image IM on the screen SCR, the displayed pixel corresponding to the first pixel G1 of the liquid crystal panel 220 shown in FIG. 3 is referred to as a first displayed pixel IM1. Note that FIG. 4 shows only the first displayed pixel IM1 and the pixels therearound out of the plurality of displayed pixels, which constitute the displayed image IM, for clarity of FIG. 4.

In FIG. 4, the displayed sub-pixels corresponding to the four sub-pixels SG1, SG2, SG3, and SG4, which constitute the first pixel G1 of the liquid crystal panel 220, are referred to as first displayed sub-pixels IM11, IM12, IM13, and IM14, respectively. The sub-pixels can be formed of the sub-pixel SG1 for green light, the sub-pixel SG2 for green light, the sub-pixel SG3 for red light, and the sub-pixel SG4 for blue light.

In the present embodiment, the sub-pixel SG1, which is one of the four sub-pixels SG1, SG2, SG3, and SG4, which constitute the first pixel G1 shown in FIG. 3, is referred to as a reference sub-pixel SG0. In the embodiment, the reference sub-pixel SG0 corresponds to the "reference unit pixel" in the claims.

Among the first displayed sub-pixels IM11, IM12, IM13, and IM14 of the displayed image IM, the first displayed sub-pixel IM11 corresponding to the reference sub-pixel SG0 is referred to as a reference displayed sub-pixel IM0.

The pixel shifting device 4 in the present embodiment superimposes the image light LT0 output from the reference sub-pixel SG0 at the shifted display position S on the region that corresponds to the black matrix BM and surrounds the reference sub-pixel SG0 but does not overlap with any of the other sub-pixels SG2, SG3 and SG4 adjacent to the reference sub-pixel SG0 at the reference display position P. That is, the displayed sub-pixels at the shifted display position S are shifted within the region corresponding to the black matrix BM around the reference display position P. The optical path of the image light LT0 output from the reference sub-pixel SG0 will be described below, and the same applies to the optical paths of the image light LT output from the other sub-pixels.

The region corresponding to the black matrix BM at the reference display position P is the region located between the displayed sub-pixels in the displayed image IM, and corresponds to a non-display section A, where no image is displayed.

That is, the pixel shifting device 4 in the present embodiment superimposes the reference displayed sub-pixel IM0 of the displayed image IM at the shifted display position S on the non-display section A of the displayed image IM, which surrounds the reference displayed sub-pixel IM0 in such a way that the reference displayed sub-pixel IM0 does not overlap with any of the first displayed sub-pixels IM12, IM13 and IM14 adjacent to the reference displayed sub-pixel IM0 at the reference display position P.

As described above, the pixel shifting device 4 in the present embodiment can efficiently superimpose the displayed sub-pixels, which constitute each of the displayed pixels of the displayed image IM after the pixel shifting, on the non-display section A of the displayed image IM before the pixel shifting. The non-display section A of the displayed image IM on the screen SCR is therefore unlikely to be noticeable.

Furthermore, since the pixel shifting device 4 in the present embodiment performs the pixel shifting in such a way that the different displayed sub-pixels of the displayed image IM before the pixel shifting do not overlap with the displayed sub-pixels after the pixel shifting, color mixture due to the overlap between the displayed sub-pixels having different colors will not occur. A decrease in color purity due to the color mixture in the displayed image IM can therefore suppressed.

The pixel shifting device 4 in the present embodiment superimposes the image light LT0 output from the reference sub-pixel SG0 at the shifted display position S on the region corresponding to an intersection BM1 of the black matrix BM and surrounded by four corners of the sub-pixels SG1, SG2, SG3 and SG4 at the reference display position P.

In other words, the pixel shifting device 4 in the present embodiment superimposes the image light LT0 output from the reference sub-pixel SG0 at the shifted display position S on the region corresponding to the intersection BM1 of the black matrix BM and adjacent to a lower right corner section of the reference sub-pixel SG0 at the reference display position P.

In the present embodiment, the intersection BM1 of the black matrix BM corresponds to "a first portion of the black matrix" and "a fifth portion of the black matrix".

In other words, it can be said the pixel shifting device 4 in the present embodiment superimposes the reference displayed sub-pixel IM0 of the displayed image IM at the shifted display position S on an intersection A1 of the non-display section A, which is surrounded by four corners of the first displayed sub-pixels IM11, IM12, IM13, and IM14 of the first displayed pixel IM1 at the reference display position P.

As described above, the pixel shifting device 4 in the present embodiment can superimpose each of the displayed sub-pixels on the portion between the four displayed sub-pixels out of the non-display section A of the displayed image IM during the pixel shifting.

As described above, the projector 100 according to the present embodiment includes the light source 10, the light modulation section 22, which has the pixel region GA containing the plurality of sub-pixels segmented by the black matrix BM and modulates the light output from the light source 10 to generate the image light LT, the projection system 3, which projects the image light LT output from the light modulation section 22 onto the screen SCR, and the pixel shifting device 4, which is disposed between the light modulation section 22 and the projection system 3 and successively shifts the optical path of the image light LT output from the light modulation section 22. In the pixel region GA, the sub-pixel SG1 is called the reference sub-pixel SG0, and the pixel shifting device 4 positions the image light LT before the pixel shifting at the reference display position P on the screen SCR, and positions the image light LT after the pixel shifting at the shifted display position S on the screen SCR to superimpose the image light LT output from the reference sub-pixel SG0 at the shifted display position S on the region that corresponds to the black matrix BM and surrounds the reference sub-pixel SG0 but does not overlap with any of the other sub-pixels SG2, SG3 and SG4 adjacent to the reference sub-pixel SG0 at the reference display position P.

The projector 100 according to the present embodiment, in which the pixel shifting causes the image light to be efficiently superimposed on the non-display section A of the displayed image IM, which is the section corresponds to the black matrix BM, can cause the non-display section A of the displayed image IM to be unlikely to be noticeable. Furthermore, the projector 100 according to the present embodiment, which superimposes the image light on the non-display section A of the displayed image IM, can increase the apparent number of pixels of the displayed image IM to increase the resolution thereof.

Moreover, in the projector 100 according to the present embodiment, since the different displayed sub-pixels of the displayed image IM before the pixel shifting do not overlap with the displayed sub-pixels after the pixel shifting, the color mixture due to the overlap between the displayed sub-pixels having different colors will not occur. A decrease in color purity due to the color mixture in the displayed image IM can therefore suppressed.

The projector 100 according to the present embodiment can therefore improve the image quality of the displayed image IM by causing the non-display section A to be unlikely to be visually recognized without the color mixture occurring in the displayed image IM, which is an enlarged image projected onto the screen SCR.

First Variation

A variation of the projector according to the first embodiment will be subsequently described as a first variation. The present variation differs from the first embodiment in terms of the pixel shift operation and has otherwise the same configurations. The following description will therefore be primarily given to the pixel shift operation, and the members common to those in the embodiment described above have the same reference characters and will not be described in detail.

Figure 5:
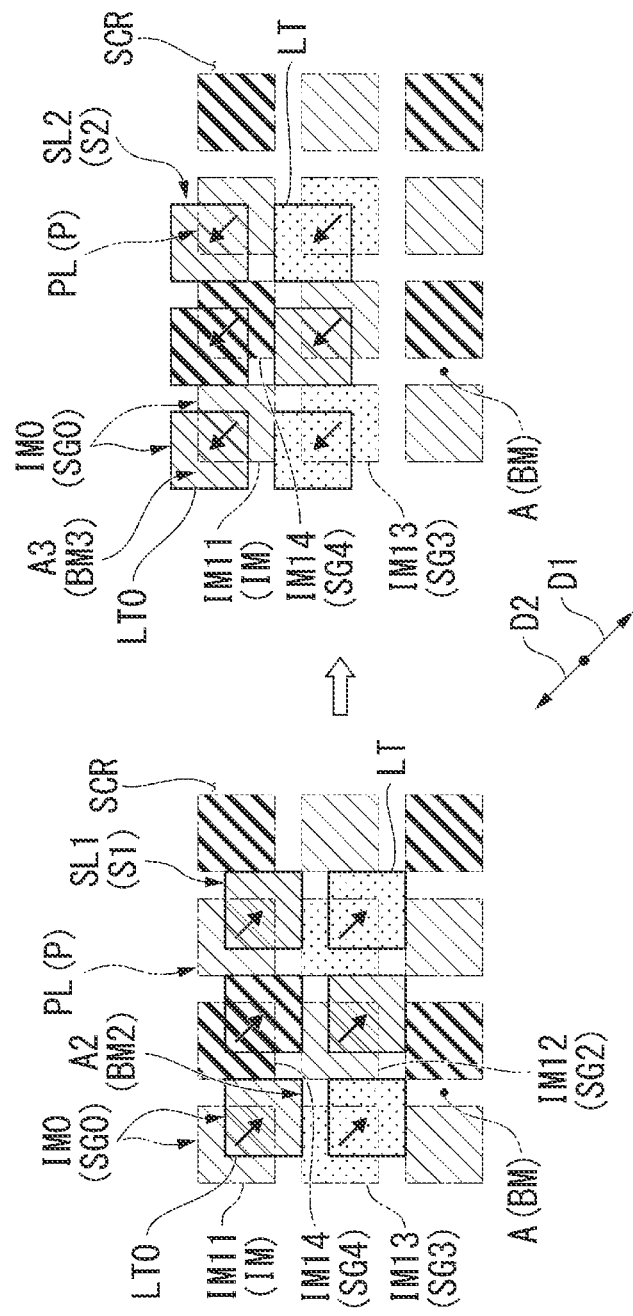
FIG. 5 shows key portions of a displayed image achieved by pixel shifting in a first variation.

FIG. 5 shows key portions of a displayed image achieved by the pixel shifting and displayed on the screen in the present variation.

The pixel shifting device 4 in the present variation successively switches the optical path of the image light LT among the reference optical path PL, a first shifted optical path SL1, and a second shifted optical path SL2 by changing the posture of the optical path changer 40, as shown in FIG. 5.

The first shifted optical path SL1 is an optical path as a result of shifting the optical path of the image light LT output from the reference sub-pixel SG0 relative to the reference optical path PL in the first direction D1 on the screen SCR. The first direction D1 corresponds to an oblique direction in which the reference sub-pixel SG0 and the sub-pixel SG2 are arranged.

The second shifted optical path SL2 is an optical path as a result of shifting the optical path of the image light LT0 output from the reference sub-pixel SG0 relative to the first shifted optical path SL1 in a second direction D2, which is opposite from the first direction D1, on the screen SCR. The second direction D2 corresponds to an oblique direction in which the sub-pixel SG2 and the reference sub-pixel SG0 are arranged. Note that, on the screen SCR, the first direction D1 corresponds to an obliquely downward and rightward direction, and the second direction D2 corresponds to an obliquely upward and leftward direction.

In the present variation, the pixel shifting device 4 positions the image light LT traveling along the reference optical path PL at the reference display position P on the screen SCR, positions the image light LT traveling along the first shifted optical path SL1 at a first shifted display position S1 on the screen SCR, and positions the image light LT traveling along the second shifted optical path SL2 at a second shifted display position S2 on the screen SCR. That is, it is desirable that the image light LT is moved from the reference display position P as the center of the movement to the first shifted display position S1 in one oblique direction and the second shift display position S2 in the other oblique direction, which is opposite from the one oblique direction, by the same amount of movement.

In the present variation, the pixel shifting device 4 switches the optical path of the image light LT0 output from the reference sub-pixel SG0 to the first shifted optical path SL1 by rotating the first movable section 41 toward one side around the first swing axis J1 to change the posture of the optical path changer 40, as shown in FIG. 2. At this point of time, the optical path of the image light LT0 output from the reference sub-pixel SG0 shifts in the first direction D1 on the screen SCR, so that the position where the displayed image IM is displayed is switched from the reference display position P to the first shifted display position S1.

The pixel shifting device 4 superimposes the image light LT0 output from the reference sub-pixel SG0 at the first shifted display position S1 on the region corresponding to a corner section BM2 of the black matrix BM and located on one of the pair of diagonal lines of the reference sub-pixel SG0 at the reference display position P in such a way that the image light LT0 does not overlap with any of the other sub-pixels SG2, SG3, and SG4 adjacent to the reference sub-pixel SG0 at the reference display position P. Note that the corner section BM2 of the black matrix BM corresponds to "a second portion of the black matrix".

That is, the pixel shifting device 4 superimposes the reference displayed sub-pixel IM0 of the displayed image IM at the first shifted display position S1 on a corner section A2 of the non-display section A, which is the section that surrounds the lower right corner section of the reference displayed sub-pixel IM0, as shown in FIG. 5.

The pixel shifting device 4 subsequently switches the optical path of the image light LT0 output from the reference sub-pixel SG0 from the first shifted optical path SL1 to the second shifted optical path SL2 by rotating the first movable section 41 toward the other side around the first swing axis J1 to change the posture of the optical path changer 40. At this point of time, the optical path of the image light LT0 output from the reference sub-pixel SG0 shifts in the second direction D2 on the screen SCR, so that the position where the displayed image IM is displayed is switched from the first shifted display position S1 to the second shifted display position S2.

The pixel shifting device 4 superimposes the image light LT0 output from the reference sub-pixel SG0 at the second shifted display position S2 on the region corresponding to a corner section BM3 of the black matrix BM and located on the other one of the pair of diagonal lines of the reference sub-pixel SG0 at the reference display position P in such a way that the image light LT0 does not overlap with any of the other sub-pixels SG2, SG3, and SG4 adjacent to the reference sub-pixel SG0 at the reference display position P. Note that the corner section BM3 of the black matrix BM corresponds to "a third portion of the black matrix".

That is, the pixel shifting device 4 superimposes the reference displayed sub-pixel IM0 of the displayed image IM at the second shifted display position S2 on a corner section A3 of the non-display section A, which is the section that surrounds an upper left corner section of the reference displayed sub-pixel IM0, as shown in FIG. 5.

As described above, the pixel shifting device 4 can superimpose the displayed sub-pixels of the displayed image IM after the pixel shifting on the portions that surround the two diagonal corner sections of the displayed sub-pixels out of the non-display section A of the displayed image IM before the pixel shifting.

The pixel shifting device 4 in the present variation, which superimposes the image light on the portions that surround the two corner sections of the displayed sub-pixels out of the non-display section A of the displayed image IM, can cause the non-display section A to be unlikely to be noticeable without the color mixture occurring in the displayed image IM.

Second Variation

Another variation of the projector according to the first embodiment will be subsequently described as a second variation. The present variation differs from the first variation in terms of the direction in which the optical path of the image light is shifted and has otherwise the same configurations.

The first embodiment and the first variation have been described with reference to the case where the pixel shifting device 4 shifts the optical path of the image light LT in a diagonal direction of each of the displayed sub-pixels of the displayed image IM during the pixel shifting, and the direction in which the optical path of the image light LT is shifted for each of the displayed sub-pixels of the displayed image IM is not limited to the direction described above.

Figure 6:
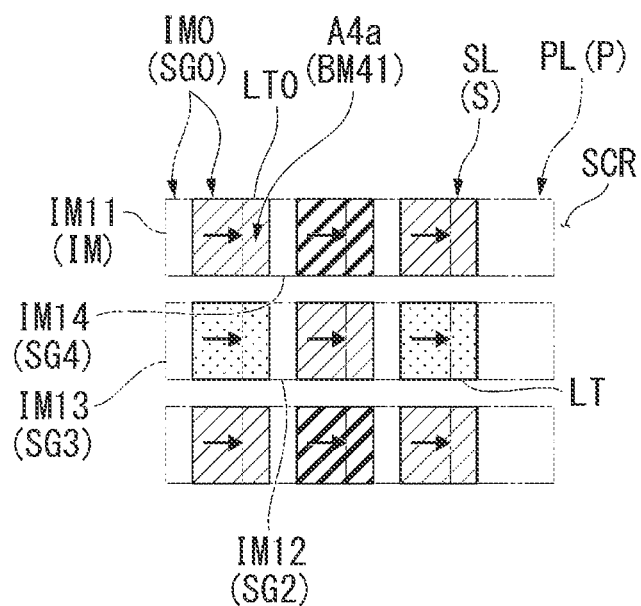
FIG. 6 shows key portions of a displayed image achieved by the pixel shifting in a second variation.

FIG. 6 shows key portions of a displayed image achieved by the pixel shifting and displayed on the screen in the present variation.

The direction in which the optical path of the image light LT is shifted in the present variation corresponds to the rightward-leftward direction X, in which the displayed sub-pixels of the displayed image IM are arranged on the screen SCR, as shown in FIG. 6.

Figure 7:
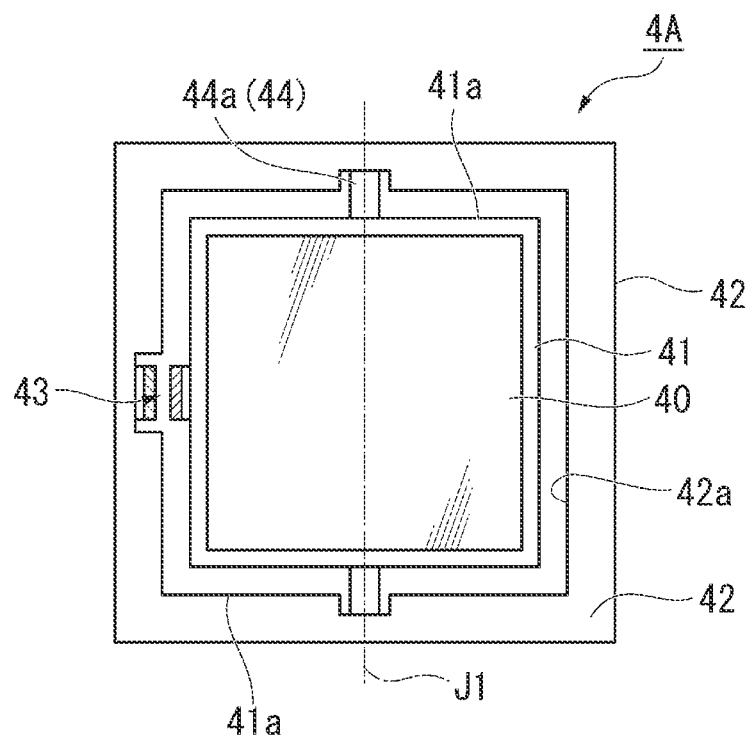
FIG. 7 shows a schematic configuration of the pixel shifting device in the second variation.

FIG. 7 shows a schematic configuration of the pixel shifting device in the present variation.

Unlike the configurations in the first embodiment and the first variation, in a pixel shifting device 4A in the present variation, the first swing axis J1 is set so as to be perpendicular to a pair of outer side surfaces 41a of the first movable section 41, which surrounds the rectangular optical path changer 40, as shown in FIG. 7. In the pixel shifting device 4A in the present variation, the first actuator 43 is provided between the outer side surface 41a of the first movable section 41 and the base inner side surface 42a of the base 42 in the direction that intersects with the first swing axis J1.

The pixel shifting device 4A in the present variation superimposes the image light LT0 output from the reference sub-pixel SG0 at the shifted display position S on the region corresponding to an adjacent edge section BM41 of the black matrix BM and adjacent to the right edge of the reference sub-pixel SG0 at the reference display position P in such a way that the image light LT0 does not overlap with any of the first displayed sub-pixels IM12, IM13, and IM14 adjacent to the reference displayed sub-pixel IM0 at the reference display position P, as shown in FIG. 6. Note that the adjacent edge section BM41 of the black matrix BM corresponds to "a fourth portion of the black matrix".

That is, the pixel shifting device 4A superimposes the reference displayed sub-pixel IM0 of the displayed image IM at the shifted display position S on the adjacent edge section BM41 of the non-display section A, which is the section that surrounds a right edge section of the reference displayed sub-pixel IM0 at the reference display position P.

Using the pixel shifting device 4A in the present variation, in which the pixel shifting causes the image light LT to be superimposed on the non-display section A of the displayed image IM, which is the section corresponds to the black matrix BM, can cause the non-display section A of the displayed image IM to be unlikely to be noticeable.

Note that the configuration in the first variation may be combined with the pixel shifting device 4A in the present variation. Specifically, the pixel shifting device 4A in the present variation switches the optical path of the image light LT0 output from the reference sub-pixel SG0 at the first shifted display position S1 between a first shifted optical path that causes the image light LT0 to be superimposed on the region corresponding to a first adjacent edge section of the black matrix BM and located on the right of the reference sub-pixel SG0 at the reference display position P and a second shifted optical path that causes the image light LT0 to be superimposed on the region corresponding to a second adjacent edge section of the black matrix BM and located on the left of the reference sub-pixel SG0 at the reference display position P.

The configuration described above can cause the non-display section A of the displayed image IM to be unlikely to be noticeable while suppressing the color mixture in the displayed image IM by superimposing the displayed sub-pixels of the displayed image IM after the pixel shifting on the portions that surround the right and left portions of the displayed sib-pixels out of the non-display section A of the displayed image IM before the pixel shifting.

The direction in which the optical path of the image light LT is shifted may instead be the upward-downward direction Z, in which the displayed sub-pixels of the displayed image IM shown in FIG. 6 are arranged on the screen SCR. In this case, the first swing axis of the pixel shifting device is set in a direction perpendicular to the first swing axis J1 shown in FIG. 7.

Second Embodiment

The projector according to a second embodiment will be subsequently described. The present embodiment differs from the first embodiment in that the pixel shifting device has two swing axes. The following description will therefore be given to the configuration of the pixel shifting device, and the members common to those in the embodiment described above have the same reference characters and will not be described in detail.

Figure 8:
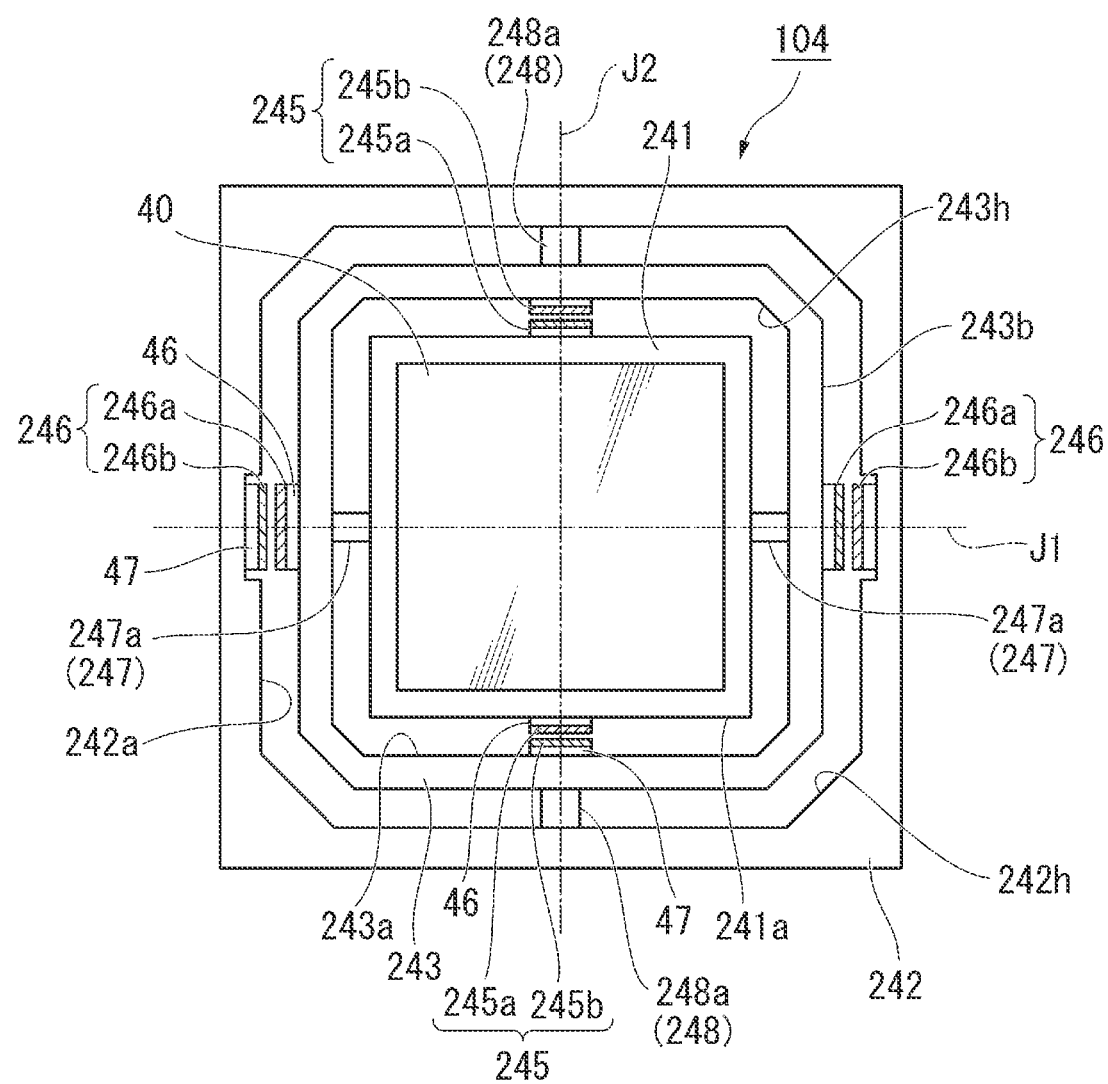
FIG. 8 is a perspective view of the pixel shifting device in a second embodiment.

FIG. 8 is a perspective view of the pixel shifting device in the present embodiment.

A pixel shifting device 104 in the present embodiment includes the optical path changer 40, a first movable section 241, which holds the optical path changer 40, a second movable section 243, which is linked to the first movable section 241 swingably around the first swing axis J1, a base 242, which is linked to the second movable section 243 swingably around a second swing axis J2, a pair of first actuators 245, which swing the first movable section 241 around the first swing axis J1, a pair of second actuators 246, which swing the second movable section 243 around the second swing axis J2, a first linkage section 247, and a second linkage section 248, as shown in FIG. 8.

The first swing axis J1 is an imaginary axis around which the first movable section 241 swings relative to the second movable section 243, and the second swing axis J2 is an imaginary axis around which the second movable section 243 swings relative to the base 242. That is, the pixel shifting device 104 in the present embodiment employs a two-axis swing scheme.

The first movable section 241 is disposed around the optical path changer 40. The first movable section 241 is formed of a rectangular-frame-shaped member, and supports the optical path changer 40 therein.

The first linkage section 247 is formed of a pair of first shaft sections 247a, which each swingably link an outer side surface 241a of the first movable section 241 to an inner side surface 243a of the second movable section 243. The pair of first shaft sections 247a protrude from the outer side surfaces opposite from each other out of the four outer side surfaces 241a of the first movable section 241, and link the first movable section 241 to the second movable section 243.

The first swing axis J1 of the first movable section 241 is an imaginary axis extending along the pair of first shaft sections 247a, and the first swing axis J1 passes through the center of the optical path changer 40 supported by the first movable section 241. The first movable section 241 is therefore rotatable relative to the second movable section 243 around the first swing axis J1. The optical path changer 40 supported by the first movable section 241 is therefore rotatable relative to the second movable section 243 around the first swing axis J1, so that the posture of the optical path changer 40 can be changed.

The second movable section 243 is formed of a substantially octagonal plate in the plan view, and has a substantially octagonal opening 243h. The first movable section 241, which supports the optical path changer 40, is disposed in the opening 243h of the second movable section 243. That is, the second movable section 243 is formed of a frame-shaped member that surrounds the first movable section 241 and disposed around the first movable section 241.

The second linkage section 248 is formed of a pair of second shaft sections 248a, which each swingably link an outer side surface 243b of the second movable section 243 to a base inner side surface 242a of the base 242. The pair of second shaft sections 248a protrude from the outer side surfaces opposite from each other out of the eight outer side surfaces 241a of the second movable section 243, and link the second movable section 243 to the base 242.

The base 242 is formed, for example, of a metal plate, and has a substantially octagonal opening 242h in the plan view, and the second movable section 243 is disposed in the opening 242h. That is, the base 242 is disposed in the form of a frame around the second movable section 243. The base 242 has the base inner side surfaces 242a, which face the outer side surfaces 243b of the second movable section 243.

The second swing axis J2 of the second movable section 243 is an imaginary axis extending along the pair of second shaft sections 248a, and the second swing axis J2 is perpendicular to the first swing axis J1 and passes through the center of the optical path changer 40 supported by the first movable section 241. The second movable section 243 is therefore rotatable relative to the base 242 around the second swing axis J2. The optical path changer 40 supported by the second movable section 243 via the first movable section 241 is therefore rotatable relative to the base 242 around the second swing axis J2, so that the posture of the optical path changer 40 can be changed.

The pair of first actuators 245 are provided at portions of the opening 243h of the second movable section 243 that face each other along the second swing axis J2, which intersects with the first swing axis J1. The first actuators 245 each include a magnet and a coil disposed with a predetermined distance therebetween in the direction along the second swing axis J2. Specifically, the first actuators 245 each include a first magnet 245a disposed at the outer side surface 241a of the first movable section 241, and a first coil 245b disposed at the inner side surface 243a of the second movable section 243 and facing the first magnet 245a, the first magnet 245a and the first coil 245b arranged in the direction along the second swing axis J2, which intersects with the first swing axis J1. Note that the first magnet 245a and the first coil 245b have the same configurations as those of the first magnet 43a and the first coil 43b, which constitute the first actuator 43 in the first embodiment, so that no description of the first magnet 245a and the first coil 245b will be made.

The first magnet 245a is disposed at the outer side surface 241a of the first movable section 241 via the magnet frame 46, which functions as a back yoke. The first coil 245b is disposed at the inner side surface 243a of the second movable section 243 via the coil frame 47, which functions as a back yoke.

Note that the positions of the first magnet 245a and the first coil 245b may be swapped, that is, the first magnet 245a may be disposed at the inner side surface 243a of the second movable section 243, the first coil 245b may be disposed at the outer side surface 241a of the first movable section 241. That is, the first magnet 245a only needs to be disposed at one of the outer side surface 241a of the first movable section 241 and the inner side surface 243a of the second movable section 243, and the first coil 245b only needs to be disposed at the other one of the outer side surface 241a of the first movable section 241 and the inner side surface 243a of the second movable section 243.

The pair of second actuators 246 are provided at portions of the opening 242h of the base 242 that face each other along the first swing axis J1, which intersects with the second swing axis J2. The second actuators 246 each include a magnet and a coil disposed with predetermined distance therebetween in the direction along the first swing axis J1. Specifically, the second actuators 246 each include a second magnet 246a disposed at the outer side surface 243b of the second movable section 243, and a second coil 246b disposed at the base inner side surface 242a of the base 242 and facing the second magnet 246a, the second magnet 246a and the second coil 246b arranged in the direction along the first swing axis J1, which intersects with the second swing axis J2. Note that the second magnet 246a and the second coil 246b have the same configurations as those of the first magnet 245a and the first coil 245b, which constitute each of the first actuators 245, so that no description of the second magnet 246a and the second coil 246b will be made.

The second magnet 246a is disposed at the outer side surface 243b of the second movable section 243 via the magnet frame 46, which functions as a back yoke. The second coil 246b is disposed at the base inner side surface 242a of the base 242 via the coil frame 47, which functions as a back yoke. Note in present embodiment that the second coil 246b is provided in a portion that forms the base inner side surface 242a and is recessed with respect to the other portions thereof.

The positions of the second magnet 246a and the second coil 246b may be swapped, that is, the second magnet 246a may be disposed at the base inner side surface 242a of the base 242, and the second coil 246b may be disposed at the outer side surface 243b of the second movable section 243. That is, the second magnet 246a only needs to be disposed at one of the outer side surface 243b of the second movable section 243 and the base inner side surface 242a of the base 242, and the second coil 246b only needs to be disposed at the other one of the outer side surface 243b of the second movable section 243 and the base inner side surface 242a of the base 242.

The first actuators 245 each produce a force acting between the first magnet 245a and the first coil 245b in a direction that intersects with the first swing axis J1 by energizing the first coil 245b to produce a magnetic field that causes the first coil 245b and the first magnet 245a to repel or attract each other. The first movable section 241 thus swings around the first swing axis J1. In the first movable section 241, since the first shaft sections 247a located at opposite ends in the direction along the first swing axis J1 are linked to the second movable section 243 as described above, the optical path changer 40 fixed to the first movable section 241 can swing relative to the second movable section 243 around the first swing axis J1.

The second actuators 246 each produce a force acting between the second magnet 246a and the second coil 246b in a direction that intersects with the second swing axis J2 by energizing the second coil 246b to produce a magnetic field that causes the second coil 246b and the second magnet 246a to repel or attract each other. The second movable section 243 thus swings around the second swing axis J2. In the second movable section 243, since the second shaft sections 248a located at opposite ends in the direction along the second swing axis J2 are linked to the base 242 as described above, the optical path changer 40 fixed to the first movable section 241 and the second movable section 243 via the first linkage section 247 can swing relative to the base 242 around the second swing axis J2.

Based on the configuration described above, the pixel shifting device 104 in the present embodiment can biaxially control the posture of the optical path changer 40, which is supported by the first movable section 241, via the first actuator 245 and the second actuator 246. The pixel shifting device 104 can therefore deflect the optical path of the image light LT output from the liquid crystal panel 220 of the image generator 2 by 90° and shift the optical path of the image light LT in the directions along the two axes by changing the posture of the optical path changer 40.

Since the pixel shifting device 104 in the present embodiment employs the configuration in which the first movable section 241, the second movable section 243, and the base 242 are disposed around the optical path changer 40, the dimension of the optical path changer 40 in the thickness direction can be reduced.

Figure 9:
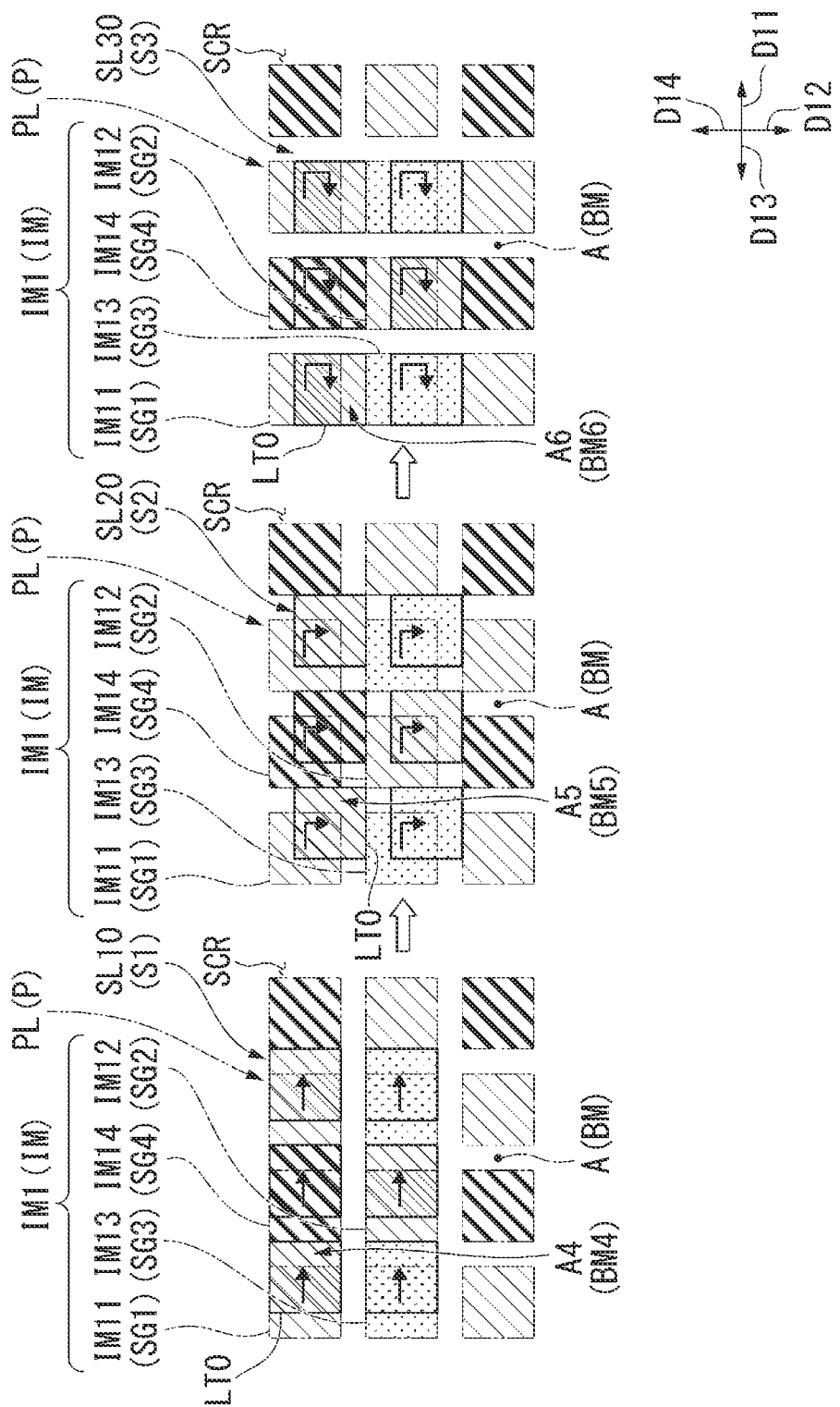
FIG. 9 describes how the pixel shifting device achieves increased image quality.

The principle of an increase in the quality of a displayed image achieved by the pixel shifting device 104 in the present embodiment will be described below. FIG. 9 describes how the pixel shifting device 104 achieves the increased image quality. FIG. 9 shows key portions of the displayed image IM displayed on the screen SCR.

In the present embodiment, the direction in which the first displayed sub-pixels IM11 and IM14 of the first displayed pixel IM1 are sequentially arranged is referred to as a first direction D11, the direction in which the first displayed sub-pixels IM14 and IM12 of the first displayed pixel IM1 are sequentially arranged is referred to as a second direction D12, the direction which is opposite of the first direction D11 and in which the first displayed sub-pixels IM12 and IM13 are sequentially arranged is referred to as a third direction D13, and the direction which is opposite of the second direction D12 and in which the first displayed sub-pixels IM13 and IM11 are sequentially arranged is referred to as a fourth direction D14.

FIG. 9 shows only part of the plurality of displayed pixels that constitute the displayed image IM, the first displayed pixel IM1 and the displayed pixels located around the first displayed pixel IM1, for clarity of FIG. 9.

The pixel shifting device 104 in the present embodiment successively switches the optical path of the image light LT among the reference optical path PL, a first shifted optical path SL10, a second shifted optical path SL20, and a third shifted optical path SL30 by changing the posture of the optical path changer 40.

The first shifted optical path SL10 is an optical path as a result of shifting the optical path of the image light LT output from the reference sub-pixel SG0 from the reference optical path PL in the first direction D11 on the screen SCR.

The second shifted optical path SL20 is an optical path as a result of shifting the optical path of the image light LT output from the reference sub-pixel SG0 from the first shifted optical path SL10 in the second direction D12 on the screen SCR.

The third shifted optical path SL30 is an optical path as a result of shifting the optical path of the image light LT output from the reference sub-pixel SG0 from the second shifted optical path SL20 in the third direction D13 on the screen SCR.

The pixel shifting device 104 in the present embodiment positions the image light LT traveling along the reference optical path PL at the reference display position P on the screen SCR, positions the image light LT traveling along the first shifted optical path SL10 at the first shifted display position S1 on the screen SCR, positions the image light LT traveling along the second shifted optical path SL20 at the second shifted display position S2 on the screen SCR, and positions the image light LT traveling along the third shifted optical path SL30 at a third shifted display position S3 on the screen SCR.

In the present embodiment, the pixel shifting device 104 switches the optical path of the image light LT0 output from the reference sub-pixel SG0 to the first shifted optical path SL10 by rotating the first movable section 241 toward one side around the first swing axis J1 to change the posture of the optical path changer 40. At this point of time, the optical path of the image light LT0 output from the reference sub-pixel SG0 shifts in the first direction D11 on the screen SCR, so that the position where the displayed image IM is displayed is switched from the reference display position P to the first shifted display position S1.

The pixel shifting device 104 in the present embodiment superimposes the image light LT0 output from the reference sub-pixel SG0 at the first shifted display position S1 on an adjacent edge section BM4 of the black matrix BM, which is the section located between the first displayed sub-pixels IM11 and IM14 and adjacent to the right edge of the reference sub-pixel SG0 at the reference display position P. Note that the adjacent edge section BM4 of the black matrix BM corresponds to the "fourth portion of the black matrix".

Specifically, the pixel shifting device 104 superimposes the reference displayed sub-pixel IM0 of the displayed image IM at the first shifted display position S1 on an adjacent edge section A4 of the non-display section A, which is the section that surrounds the right edge section of the reference displayed sub-pixel IM0.

The pixel shifting device 104 subsequently switches the optical path of the image light LT0 output from the reference sub-pixel SG0 to the second shifted optical path SL2 by rotating the second movable section 243 around the second swing axis J2 to change the posture of the optical path changer 40. At this point of time, the optical path of the image light LT0 output from the reference sub-pixel SG0 shifts in the second direction D12 on the screen SCR, so that the position where the displayed image IM is displayed is switched from the first shifted display position S1 to the second shifted display position S2.

The pixel shifting device 104 in the present embodiment shifts the image light LT0 output from the reference sub-pixel SG0 at the second shifted display position S2 from the first shifted optical path SL10 to superimpose the image light LT0 on an adjacent corner section BM5 of the black matrix BM, which is the section adjacent to the lower right corner section of the reference sub-pixel SG0 in such a way that the image light LT0 does not overlap with any of the three sub-pixels SG2, SG3 and SG4, which are adjacent to the reference sub-pixel SG0, at the reference display position P. Note that the adjacent corner section BM5 of the black matrix BM corresponds to the "fifth portion of the black matrix".

Specifically, the pixel shifting device 104 in the present embodiment superimposes the reference displayed sub-pixel IM0 of the displayed image IM at the second shifted display position S2 on an adjacent corner section A5 of the non-display section A, which is the section that surrounds the lower right corner section of the reference displayed sub-pixel IM0.

The pixel shifting device 104 subsequently switches the optical path of the image light LT0 output from the reference sub-pixel SG0 to the third shifted optical path SL30 by rotating the first movable section 241 toward the other side around the first swing axis J1 to change the posture of the optical path changer 40. At this point of time, the optical path of the image light LT0 output from the reference sub-pixel SG0 shifts in the third direction D13 on the screen SCR, so that the position where the displayed image IM is displayed is switched from the second shifted display position S2 to the third shifted display position S3.

The pixel shifting device 104 in the present embodiment shifts the image light LT0 output from the reference sub-pixel SG0 from the second shifted optical path SL20 at the third shifted display position S3 to superimpose the image light LT0 on an adjacent edge section BM6 of the black matrix BM, which is the section located between the first displayed sub-pixels IM11 and IM13 and adjacent to the lower edge of the reference sub-pixel SG0, at the reference display position P. Note that the adjacent edge section BM6 of the black matrix BM corresponds to the "fourth portion of the black matrix".

Specifically, the pixel shifting device 104 in the present embodiment superimposes the reference displayed sub-pixel IM0 of the displayed image IM at the third shifted display position S3 on an adjacent edge section A6 of the non-display section A, which is the section that surrounds the lower edge of the reference displayed sub-pixel IM0.

The pixel shifting device 104 in the present embodiment subsequently switches the optical path of the image light LT0 output from the reference sub-pixel SG0 from the third shifted optical path SL30 to the reference optical path PL. Similarly in the following operation, the pixel shifting device 104 repeatedly shifts the optical path of the image light LT0 output from the reference sub-pixel SG0 sequentially to the reference optical path PL, the first shifted optical path SL10, the second shifted optical path SL20, the third shifted optical path SL30, and the reference optical path PL.

As described above, the pixel shifting device 104 in the present embodiment can shift the image light LT0 output from the reference sub-pixel SG0 during the pixel shifting along the region corresponding to the black matrix BM and adjacent to the two edges that sandwich the lower right corner section of the reference sub-pixel SG0 at the reference display position P.

As described above, the projector according to the present embodiment, in which the pixel shifting device 104 controls the posture of the optical path changer 40 around two axes to shift the optical path of the image light LT relative to the reference optical path PL three times, can cause the non-display section A of the displayed image IM on the screen SCR excluding the outermost edge of the non-display section A to be unlikely to be visually recognized. Furthermore, since the amount of shift of the optical path of the image light LT increases as compared with that in the configurations in the embodiments and variations described above, the pseudo-resolution of the displayed image IM can be further improved.

The projector according to the present embodiment can also improve the quality of the displayed image IM by causing the inter-pixel non-display section A to be unlikely to be recognized without the color mixture occurring in the displayed image IM, which is an enlarged image projected onto the screen SCR.

Third Variation

A variation of the projector according to the second embodiment will be subsequently described as a third variation. The present variation differs from the second embodiment in terms of the pixel shift operation and has otherwise the same configurations. The following description will therefore be primarily given to the pixel shift operation, and the members common to those in the embodiments described above have the same reference characters and will not be described in detail.

Figure 10A:
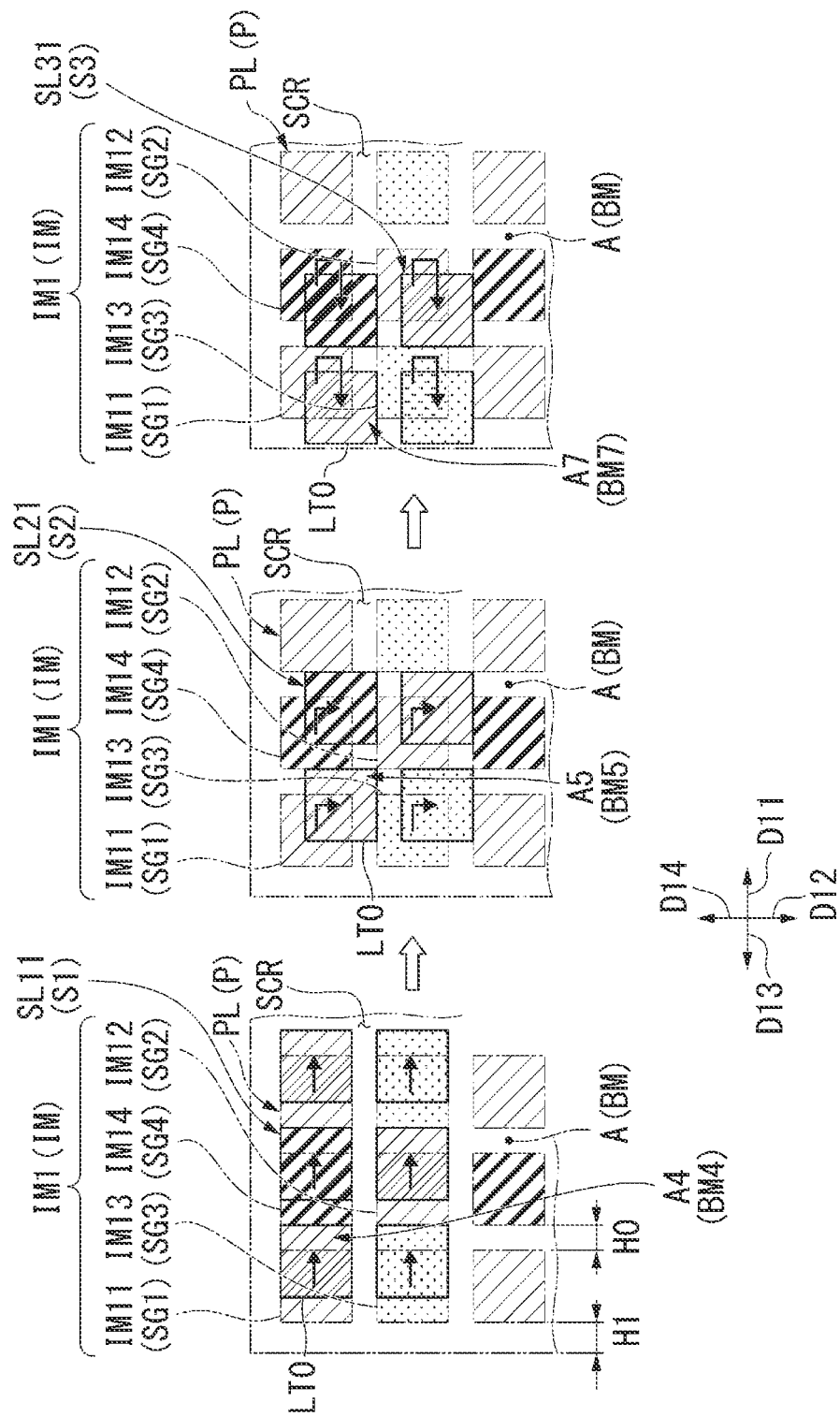
FIG. 10A shows key portions of a displayed image achieved by the pixel shifting in a third variation.
Figure 10B:
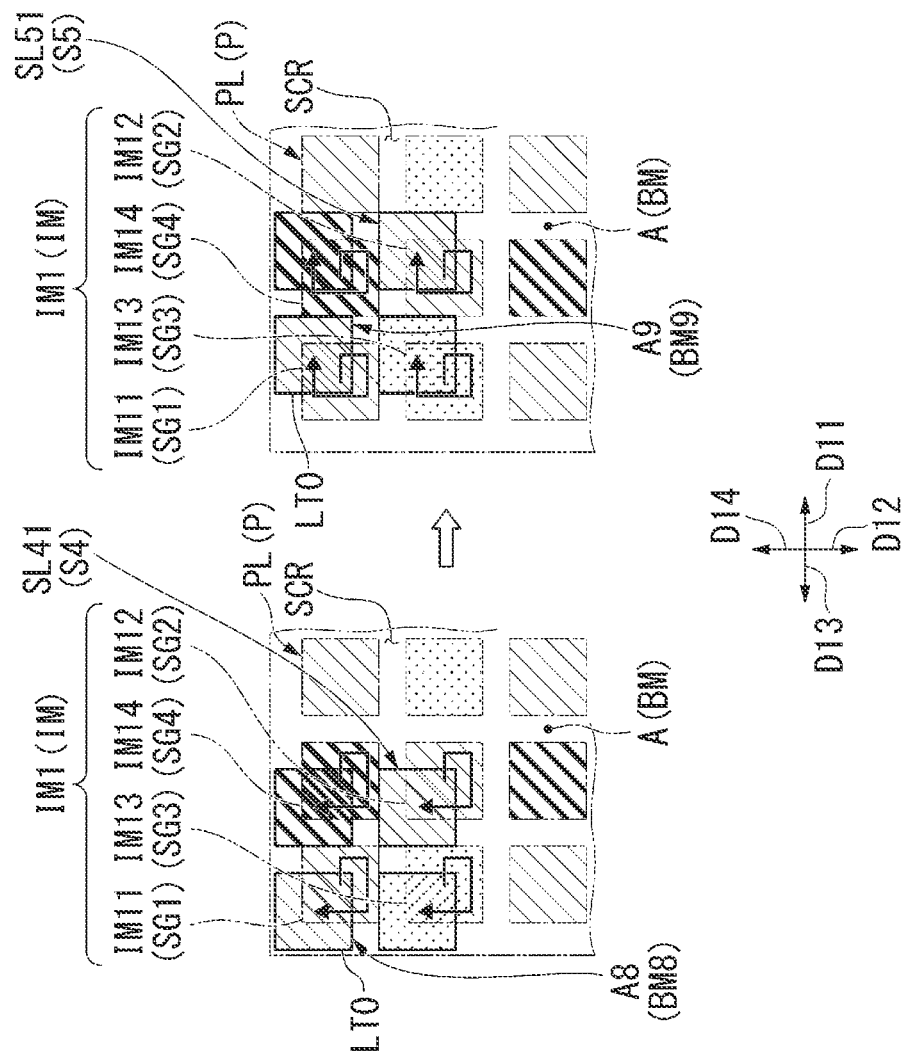
FIG. 10B shows key portions of the displayed image achieved by the pixel shifting in the third variation.

FIGS. 10A and 10B show key portions of a displayed image achieved by the pixel shifting and displayed on the screen in the present variation.

The pixel shifting device 104 in the present variation successively switches the optical path of the image light LT among the reference optical path PL, a first shifted optical path SL11, a second shifted optical path SL21, a third shifted optical path SL31, a fourth shifted optical path SL41, and a fifth shifted optical path SL51 by changing the posture of the optical path changer 40, as shown in FIGS. 10A and 10B.

The first shifted optical path SL11 is an optical path as a result of shifting the optical path of the image light LT output from the reference sub-pixel SG0 relative to the reference optical path PL in the first direction D11 on the screen SCR.

The second shifted optical path SL21 is an optical path as a result of shifting the optical path of the image light LT output from the reference sub-pixel SG0 from the first shifted optical path SL11 in the second direction D12 on the screen SCR.

The third shifted optical path SL31 is an optical path as a result of shifting the optical path of the image light LT output from the reference sub-pixel SG0 from the second shifted optical path SL21 in the third direction D13 on the screen SCR.

The fourth shifted optical path SL41 is an optical path as a result of shifting the optical path of the image light LT output from the reference sub-pixel SG0 from the third shifted optical path SL31 in the fourth direction D14 on the screen SCR.

The fifth shifted optical path SL51 is an optical path as a result of shifting the optical path of the image light LT output from the reference sub-pixel SG0 from the fourth shifted optical path SL41 in the first direction D11 on the screen SCR.

In the present variation, the pixel shifting device 104 positions the image light LT traveling along the reference optical path PL at the reference display position P on the screen SCR, positions the image light LT traveling along the first shifted optical path SL11 at the first shifted display position S1 on the screen SCR, positions the image light LT traveling along the second shifted optical path SL21 at the second shifted display position S2 on the screen SCR, positions the image light LT traveling along the third shifted optical path SL31 at the third shifted display position S3 on the screen SCR, positions the image light LT traveling along the fourth shifted optical path SL41 at a fourth shifted display position S4 on the screen SCR, and positions the image light LT traveling along the fifth shifted optical path SL51 at a fifth shifted display position S5 on the screen SCR.

The pixel shifting device 104 superimposes the image light LT0 output from the reference sub-pixel SG0 at the first shifted display position S1 on the adjacent edge section BM4 of the black matrix BM, which is the section located between the first displayed sub-pixels IM11 and IM14 and adjacent to the right edge of the reference sub-pixel SG0, at the reference display position P. The reference displayed sub-pixel IM0 of the displayed image IM at the first shifted display position S1 is thus superimposed on the adjacent edge section A4 of the non-display section A, which is the section that surrounds the right edge section of the reference displayed sub-pixel IM0.

The pixel shifting device 104 shifts the image light LT0 output from the reference sub-pixel SG0 at the second shifted display position S2 from the first shifted optical path SL11 to superimpose the image light LT0 on the adjacent corner section BM5 of the black matrix BM, which is the section adjacent to the lower right corner section of the reference sub-pixel SG0 in such a way that the image light LT0 does not overlap with any of the three sub-pixels SG2, SG3 and SG4, which are adjacent to the reference sub-pixel SG0, at the reference display position P. The reference displayed sub-pixel IM0 of the displayed image IM at the second shifted display position S2 is thus superimposed on the adjacent corner section A5 of the non-display section A, which is the section that surrounds the lower right corner section of the reference displayed sub-pixel IM0.

The pixel shifting device 104 shifts the image light LT0 output from the reference sub-pixel SG0 at the third shifted display position S3 from the second shifted optical path SL21 to superimpose the image light LT0 on an adjacent corner section BM7 of the black matrix BM, which is the section adjacent to a lower left corner section of the reference sub-pixel SG0, at the reference display position P. Note that the adjacent corner section BM7 of the black matrix BM corresponds to the "fifth portion of the black matrix".

Specifically, the pixel shifting device 104 superimposes the reference displayed sub-pixel IM0 of the displayed image IM at the third shifted display position S3 on an adjacent corner section A7 of the non-display section A, which is the section that surrounds a lower left corner section of the reference displayed sub-pixel IM0.

The pixel shifting device 104 shifts the image light LT0 output from the reference sub-pixel SG0 at the fourth shifted display position S4 from the third shifted optical path SL31 to superimpose the image light LT0 on an adjacent corner section BM8 of the black matrix BM, which is the section adjacent to an upper left corner of the reference sub-pixel SG0, at the reference display position P. The adjacent corner section BM8 of the black matrix BM corresponds to part of the outermost edge of the black matrix BM. Note that the adjacent corner section BM8 of the black matrix BM corresponds to the "fifth portion of the black matrix".

Specifically, the pixel shifting device 104 superimposes the reference displayed sub-pixel IM0 of the displayed image IM at the fourth shifted display position S4 on an outer edge section A8 of the non-display section A, which is the section that surrounds the upper left corner section of the reference displayed sub-pixel IM0.

The pixel shifting device 104 shifts the image light LT0 output from the reference sub-pixel SG0 at the fifth shifted display position S5 from the fourth shifted optical path SL41 to superimpose the image light LT0 on an adjacent corner section BM9 of the black matrix BM, which is the section adjacent to an upper right corner section of the reference sub-pixel SG0, at the reference display position P. The adjacent corner section BM9 of the black matrix BM corresponds to part of the outermost edge of the black matrix BM and the inter-pixel portion of the black matrix BM located between the sub-pixels SG1 and SG4. The adjacent corner section BM9 of the black matrix BM corresponds to the "fourth and fifth portions of the black matrix".

The pixel shifting device 104 switches the optical path of the image light LT0 output from the reference sub-pixel SG0 from the fifth shifted optical path SL51 to the second shifted optical path SL21. Similarly in the following operation, the pixel shifting device 104 repeatedly shifts the optical path of the image light LT0 output from the reference sub-pixel SG0 sequentially to the second shifted optical path SL21, the third shifted optical path SL31, the fourth shifted optical path SL41, and the fifth shifted optical path SL51.

As described above, the pixel shifting device 104 in the present variation shifts the image light LT0 output from the reference sub-pixel SG0 during the pixel shifting along the region corresponding to the black matrix BM and adjacent to the two edges that sandwich the lower right corner section of the reference sub-pixel SG0, the right edge and the lower edge, at the reference display position P. The pixel shifting device 104 in the present variation further shifts the image light LT0 output from the reference sub-pixel SG0 during the pixel shifting along the region corresponding to the black matrix BM and adjacent to the four corner sections of the reference sub-pixel SG0 at the reference display position P.

In the present variation, the amount of shift of the optical path of the image light LT at each of the first shifted display position S1 to the fifth shifted display position S5 is set to the width between the sub-pixels of the black matrix BM. The reason for this is to prevent color mixture between adjacent pixels during pixel shifting due to overlap between the optical path of the image light LT emitted from one of the sub-pixels and the optical path of the image light LT output from the other sub-pixel.

In general, a width H1 of the outermost edge portion of the black matrix BM is greater than a width H0 between sub-pixels, as shown in FIG. 10A. Therefore, during the shift operation, the optical path of the image light output from a sub-pixel cannot be fully superimposed on the entire outermost edge of the black matrix BM, but the outermost edge portion of the black matrix BM has a small width exposed to the image light, so that the visibility of the displayed image IM is not affected.

As described above, the projector according to the present variation can cause almost the entire non-display section A of the displayed image IM on the screen SCR to be unlikely to be visually recognized. The quality of the displayed image IM can therefore be further improved by causing the inter-pixel non-display section A to be unlikely to be recognized without the color mixture occurring in the displayed image IM, which is an enlarged image projected onto the screen SCR. Furthermore, according to the configuration in the present variation, increasing the amount of shift of the optical path of the image light LT allows further improvement in the pseudo-resolution of the displayed image IM.

Third Embodiment

The projector according to a third embodiment will be subsequently described. The present embodiment differs from the embodiments described above is that the projector employs a three-panel scheme using three liquid crystal panels. The following description will therefore be given to the configuration of the projector, and the members common to those in the embodiments described above have the same reference characters and will not be described in detail.

Figure 11:
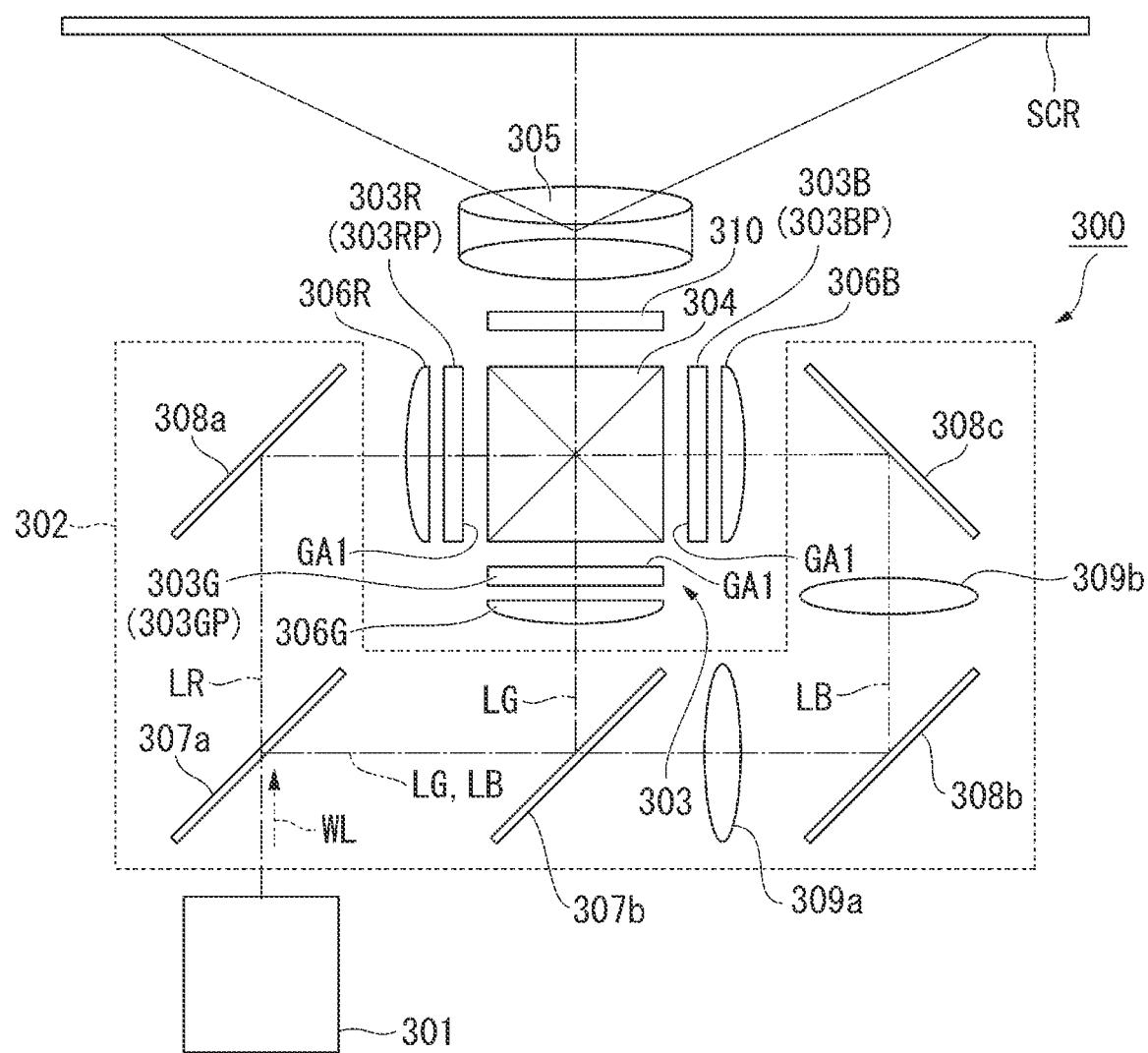
FIG. 11 shows a schematic configuration of the projector according to a third embodiment.

FIG. 11 shows a schematic configuration of the projector according to the present embodiment.

A projector 300 according to the present embodiment includes a light source 301, a color separation system 302, a light modulation section 303, a projection system 305, and a pixel shifting device 310, as shown in FIG. 11.

The light source 301 includes, for example, a laser light source, a wavelength converter, and other components. The light source 301 includes a focusing lens that focuses blue laser light output as excitation light from the laser light source, and causes the focused blue laser light to be incident on a wavelength converter containing a phosphor, which outputs white light WL formed the blue laser light and yellow fluorescence. The light source 301 does not necessarily have the configuration using a laser light source and a wavelength converter and may, for example, have a configuration using a laser light source alone or a configuration using an LED (light emitting diode) or a discharge-type light source lamp.

The light modulation section 303 includes a light modulator 303R, which outputs red image light, a light modulator 303G, which outputs green image light, a light modulator 303B, which outputs blue image light, and a light combiner 304. The light modulation section 303 modulates the light output from the light source 301 based on image information to generate the image light LT.

The color separation system 302 includes a first dichroic mirror 307a, a second dichroic mirror 307b, a first reflection mirror 308a, a second reflection mirror 308b, a third reflection mirror 308c, a relay lens 309a, and a relay lens 309b. The color separation system 302 separates the white light WL output from the light source 301 into red light LR, green light LG, and blue light LB.

The first dichroic mirror 307a separates the white light WL output from the light source 301 into the red light LR and the mixture of the green light LG and the blue light LB. The first dichroic mirror 307a reflects the red light LR and transmits the green light LG and the blue light LB. The second dichroic mirror 307b separates the mixture of the green light LG and the blue light LB into the green light LG and the blue light LB. The second dichroic mirror 307b reflects the green light LG and transmits the blue light LB.

The first reflection mirror 308a is disposed in the optical path of the red light LR. The first reflection mirror 308a reflects the red light LR reflected off the first dichroic mirror 307a toward the light modulator 303R. The second reflection mirror 308b and the third reflection mirror 308c are disposed in the optical path of the blue light LB. The second reflection mirror 308b and the third reflection mirror 308c guide the blue light LB having passed through the second dichroic mirror 307b to the light modulator 303B.

The light modulator 303R is formed of a liquid crystal panel 303RP and polarizers (not shown) provided on the light incident side and the light exiting side of the liquid crystal panel 303RP. The light modulator 303G is formed of a liquid crystal panel 303GP and polarizers (not shown) provided on the light incident side and the light exiting side of the liquid crystal panel 303GP. The light modulator 303B is formed of a liquid crystal panel 303BP and polarizers (not shown) provided on the light incident side and the light exiting side of the liquid crystal panel 303BP.

In the present embodiment, the liquid crystal panels 303RP, 303GP, and 303BP each have a pixel structure in which the color filters are removed from the liquid crystal panel 220 shown in FIG. 3 to modulate the monochromatic light. That is, the liquid crystal panels 303RP, 303GP, and 303BP each have a pixel region GA1 containing a plurality of pixels G1 segmented by the black matrix. In the present embodiment, the pixels G1 are each the smallest unit pixel in the pixel region GA1 of each of the liquid crystal panels 303RP, 303GP, and 303BP, and corresponds to the "unit pixel" in the claims.

The light modulator 303R modulates the red light LR out of the white light WL output from the light source 301 in accordance with an image signal. The light modulator 303G modulates the green light LG out of the white light WL output from the light source 301 in accordance with an image signal. The light modulator 303B modulates the blue light LB out of the white light WL output from the light source 301 in accordance with an image signal. The light modulators 303R, 303G, and 303B thus generate the image light LT corresponding to the red light, the green light, and the blue light.

A field lens 306R, which parallelizes the red light LR to be incident on the light modulator 303R, is disposed on the light incident side of the light modulator 303R. A field lens 306G, which parallelizes the green light LG to be incident on the light modulator 303G, is disposed on the light incident side of the light modulator 303G. A field lens 306B, which parallelizes the blue light LB to be incident on the light modulator 303B, is disposed on the light incident side of the light modulator 303B.

The light combiner 304 is formed of a cross dichroic prism having a substantially cubic shape. The light combiner 304 combines the color light fluxes from the pixels corresponding to one another in the light modulators 303R, 303G, and 303B with one another to generate the image light LT. The image light LT therefore has the same pixel structure as that of the pixel region GA1 of each of the liquid crystal panels 303RP, 303GP, and 303BP.

In the projector 300 according to the present embodiment, the image light LT output from the light modulation section 303 is incident on the pixel shifting device 310. The pixel shifting device 310 in the present embodiment shifts the optical path of the image light LT with the aid of refraction by changing the posture of the optical path changer made of a glass plate. The pixel shifting device 310 in the present embodiment has the same configuration as that of the pixel shifting devices 4 and 104 in the embodiments described above except that a member that transmits the image light LT is used as the optical path changer.

The projection system 305 enlarges the image light LT output from the pixel shifting device 310 and projects the enlarged image light LT toward the screen SCR.

The projector 300 according to the present embodiment, in which the pixel shifting device 310 shifts the optical path of the image light LT as in the embodiments and variations described above, can also improve the quality of the displayed image IM by causing the inter-pixel non-display section A to be unlikely to be recognized without the color mixture occurring in the displayed image IM, which is an enlarged image projected onto the screen SCR.

The technical scope of the present disclosure is not limited to the embodiments described above, and a variety of changes can be made thereto to the extent that the changes do not depart from the intent of the present disclosure.

In addition to the above, the number, arrangement, shape, material, and other specific factors of the variety of components that constitute the projector are not limited to those in the embodiments described above and can be changed as appropriate.

For example, the structure of the pixels of the liquid crystal panel 220 is not limited to the structure shown in FIG. 3.

Figure 12:
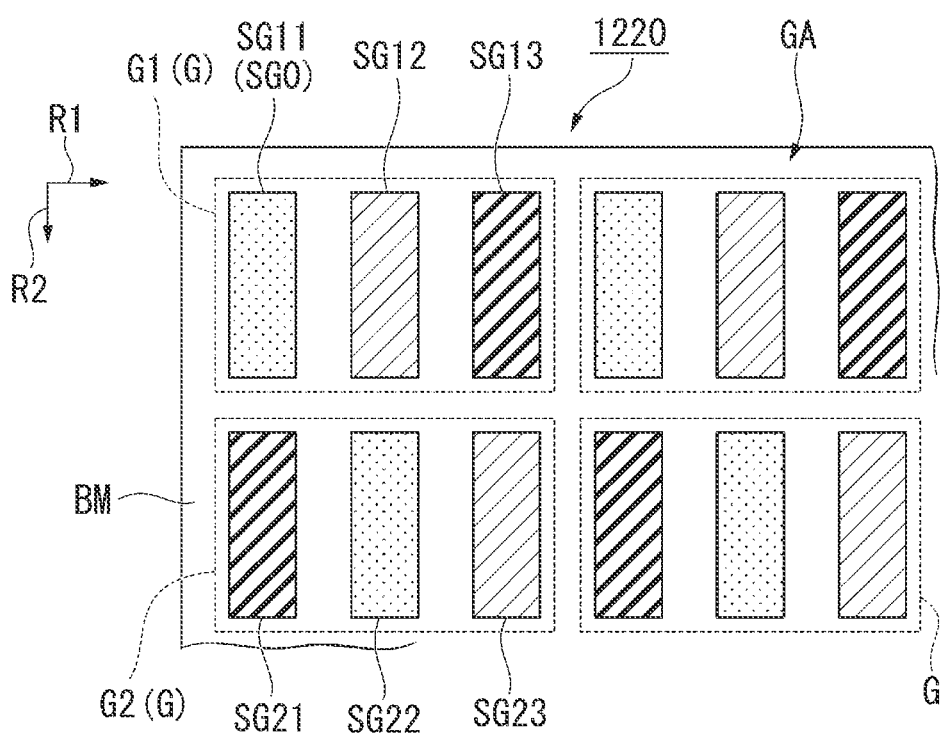
FIG. 12 is a plan view showing another structure of the pixels of the liquid crystal panel.

FIG. 12 is a plan view showing another structure of the pixels of the liquid crystal panel.

In the pixel region GA of a liquid crystal panel 1220, the plurality of pixels G are arranged in a matrix in the row direction R1 and the column direction R2 perpendicular to each other, as shown in FIG. 12. The pixels G are each formed of three quadrangular sub-pixels sequentially arranged in the row direction R1. The sub-pixels can, for example, be formed of a sub-pixel SG11 for red light, a sub-pixel SG12 for green light, a sub-pixel SG13 for blue light, a sub-pixel SG21 for blue light, a sub-pixel SG22 for red light, and a sub-pixel SG23 for green light. Note that the pixels G may each be formed of four sub-pixels sequentially arranged in the row direction R1.

The displayed image IM on the screen SCR has the same pixel structure as that of the pixel region GA of the liquid crystal panel 1220, as described above. The displayed pixels of the displayed image IM displayed by the projector using the liquid crystal panel 1220 shown in FIG. 12 are each formed of three displayed sub-pixels arranged in the row direction R1.

Even in the projector using the liquid crystal panel 1220 having the pixel structure having a plurality of quadrangular sub-pixels, the pixel shifting devices 4 and 104 can cause the non-display portion A located between the pixels of the displayed image IM to be unlikely to be visually recognized by performing the pixel shifting, as in the embodiments and variations described above.

The light modulation section can be defined in several ways. The light modulating section can include a liquid crystal panel. The light modulation section can include a liquid crystal apparatus in which the liquid crystal panel includes a polarizer. The light modulation section can instead include a liquid crystal panel including a color filter. The light modulation section can still instead include a liquid crystal panel that does not incorporate a color filter on which color light is incident. The light modulation section can still instead be formed of a single liquid crystal panel. The light modulation section can still instead include a liquid crystal panel on which red light is incident, a liquid crystal panel on which blue light is incident, and a liquid crystal panel on which green light is incident. The light modulation section can still instead include a light modulator in which the liquid crystal panel includes a polarizer.

The first and second embodiments and first to third variations have been described with reference to the case in which the pixel shifting devices 4 and 104 are each a reflective device that reflects the image light LT, and a transmissive device that transmits the image light LT may be employed, as in the pixel shifting device 310 in the third embodiment.

The present disclosure will be summarized below as additional remarks.

Additional Remark 1

A projector including a light source, a light modulation section that has a pixel region containing a plurality of unit pixels segmented by a black matrix and modulates light incident from the light source to generate image light, a projection system that projects the image light output from the light modulation section onto a projection receiving surface, and a pixel shifting device that is disposed between the light modulation section and the projection system and shifts the optical path of the image light output from the light modulation section, one of the plurality of unit pixels in the pixel region set as a reference unit pixel, the pixel shifting device positioning the image light before the optical path is shifted at a reference display position on the projection receiving surface and positioning the image light after the optical path is shifted at a shifted display position on the projection receiving surface, the pixel shifting device superimposing the image light output from the reference unit pixel at the shifted display position on the region corresponding to the black matrix and surrounding the reference unit pixel at the reference display position in such a way that the image light does not overlap with other unit pixels adjacent to the reference unit pixel out of the unit pixels.

According to the thus configured projector, in which the pixel shifting device shifts the optical path of the image light to switch the image display position, the image light is superimposed on the region of the light modulation section that corresponds to the black matrix where no image is normally displayed, so that the non-display section corresponding to the black matrix out of the displayed image is unlikely to be noticeable. Before and after the pixel shifting, the image light output from the reference unit pixel does not overlap the other adjacent unit pixels, so that occurrence of the color mixture due to overlapping between the unit pixels for different colors can be suppressed. A decrease in color purity due to the color mixture in the displayed image can therefore suppressed.

The thus configured projector can therefore improve the quality of the displayed image by causing the non-display section to be unlikely to be recognized while suppressing the color mixture in the displayed image.

Additional Remark 2

The projector described in the additional remark 1, in which one of four of the unit pixels, the four unit pixels diagonally disposed and forming two pairs that intersect with each other in the pixel region, is set as the reference unit pixel, and the pixel shifting device superimposes the image light output from the reference unit pixel at the shifted display position on the region corresponding to a first portion of the black matrix and surrounded by corners of the four unit pixels at the reference display position.

The configuration described above, which uses the light modulation section having the pixel region in which the pixels are each formed of four sub-pixels, allows improvement in the quality of the displayed image while suppressing the color mixture in the displayed image.

Additional Remark 3

The projector described in the additional remark 1 or 2, in which the pixel shifting device shifts the optical path of the image light output from the light modulation section to successively switch the optical path between a first shifted optical path that causes the shifted image light to be located at a first shifted display position on the projection receiving surface and a second shifted optical path that causes the shifted image light to be located at a second shifted display position on the projection receiving surface, superimposes the image light output from the reference unit pixel at the first shifted display position on the region corresponding to a second portion of the black matrix and located at one side of the reference unit pixel at the reference display position, and superimposes the image light output from the reference unit pixel at the second shifted display position on the region corresponding to a third portion of the black matrix and located at the other side of the reference unit pixel at the reference display position.

According to the configuration described above, the pixel shifting allows the image light to be superimposed on the regions corresponding to the second and third portions of the black matrix and located at opposite sides of each of the unit pixels of the displayed image. The configuration described above can therefore cause the opposite sides that sandwich each of the unit pixels out of the non-display section of the displayed image to be unlikely to be recognized.

Additional Remark 4

The projector described in the additional remark 1, in which the pixel shifting device has a single swing axis around which the pixel shifting device swings an optical path changer that changes the optical path of the image light.

According to the configuration described above, swinging the optical path changer around the single axis to shift the optical path of the image light in two directions allows the image light to be satisfactorily superimposed on the non-display section of the displayed image.

Additional Remark 5

The projector described in the additional remark 4, in which the pixel shifting device superimposes the image light output from the reference unit pixel at the shifted display position on the region corresponding to a fourth portion of the black matrix and adjacent to an edge of the reference unit pixel at the reference display position.

According to the configuration described above, the pixel shifting allows the image light to be incident and superimposed on the fourth portion of the black matrix, which is adjacent to an edge of each of the unit pixels of the displayed image. The configuration described above can therefore cause the portion adjacent to an edge of each of the unit pixels out of the non-display section of the displayed image to be unlikely to be recognized.

Additional Remark 6

The projector described in the additional remark 4, in which the pixel shifting device superimposes the image light output from the reference unit pixel at the shifted display position on the region corresponding to a fifth portion of the black matrix and adjacent to a corner of the reference unit pixel at the reference display position.

According to the configuration described above, the pixel shifting allows the image light to be incident and superimposed on the fifth portion of the black matrix, which is adjacent to a corner of each of the unit pixels of the displayed image. The configuration described above can therefore cause the portion adjacent to a corner of each of the unit pixels out of the non-display section of the displayed image to be unlikely to be recognized.

Additional Remark 7

The projector described in the additional remark 5 or 6, in which the pixel shifting device shifts the optical path of the image light output from the light modulation section to successively switch the optical path between a first shifted optical path that causes the shifted image light to be located at a first shifted display position on the projection receiving surface and a second shifted optical path that causes the shifted image light to be located at a second shifted display position on the projection receiving surface, superimposes the image light output from the reference unit pixel at the first shifted display position on the region corresponding to a second portion of the black matrix and located at one side of the reference unit pixel at the reference display position, and superimposes the image light output from the reference unit pixel at the second shifted display position on the region corresponding to a third portion of the black matrix and located at the other side of the reference unit pixel at the reference display position.

According to the configuration described above, the pixel shifting allows the image light to be superimposed on the regions corresponding to the second and third portions of the black matrix and located at opposite sides of each of the unit pixels of the displayed image. The configuration described above can therefore cause the opposite sides that sandwich each of the unit pixels out of the non-display section of the displayed image to be unlikely to be recognized.

Additional Remark 8

The projector described in the additional remark 1, in which the pixel shifting device has two swing axes around which the pixel shifting device swings an optical path changer that changes the optical path of the image light.

According to the configuration described above, swinging the optical path changer around the two axes to shift the optical path of the image light in a variety of directions allows the image light to be efficiently superimposed on the non-display section of the displayed image.

Additional Remark 9

The projector described in the additional remark 8, in which the pixel shifting device shifts the image light output from the reference unit pixel during the pixel shifting along the region corresponding to the black matrix and adjacent to two edges that sandwich a corner of the reference unit pixel at the reference display position.

The configuration described above allows the image light to be incident along the black matrix adjacent to two edges that sandwich a corner of the reference unit pixel. The configuration described above can therefore cause the portion adjacent to two edges that sandwich a corner of the reference unit pixel out of the non-display section of the displayed image to be unlikely to be recognized.

Additional Remark 10

The projector described in the additional remark 9, in which the pixel shifting device shifts the image light output from the reference unit pixel during the pixel shifting along the region corresponding to the black matrix and adjacent to a plurality of corners of the reference unit pixel at the reference display position.

The configuration described above allows the image light to be incident along the black matrix adjacent to corners of the reference unit pixel. The configuration described above can therefore cause the portion adjacent to corners of the reference unit pixel out of the non-display section of the displayed image to be unlikely to be recognized.

Additional Remark 11

The projector described in the additional remark 9 or 10, in which the pixel shifting device shifts the image light along the region corresponding to the black matrix and adjacent to four edges of the reference unit pixel during the pixel shifting.

The configuration described above allows the image light to be incident along the black matrix adjacent to four edges of the reference unit pixel. The configuration described above can therefore cause the portion adjacent to four edges of the reference unit pixel out of the non-display section of the displayed image to be unlikely to be recognized.

What is claimed is:

1. A projector comprising:
a light source;
a light modulation panel that has a pixel region containing a plurality of unit pixels segmented by a black matrix and modulates light incident from the light source to generate image light;
a projection system that projects the image light output from the light modulation panel onto a projection receiving surface; and
a pixel shifting device that is disposed between the light modulation panel and the projection system and shifts an optical path of the image light output from the light modulation panel,
wherein one of the plurality of unit pixels in the pixel region is set as a reference unit pixel,
before the optical path is shifted at a reference display position on the projection receiving surface, the pixel shifting device shifts the optical path of the image light output from the light modulation panel to successively switch the optical path between a first shifted optical path that causes the shifted image light to be located at a first shifted display position on the projection receiving surface and a second shifted optical path that causes the shifted image light to be located at a second shifted display position on the projection receiving surface, and
the pixel shifting device superimposes the image light output from the reference unit pixel at the first shifted display position on a region corresponding to a second portion of the black matrix and located at one side of the reference unit pixel at the reference display position,
and surrounding the reference unit pixel at the reference display position in such a way that the image light does not overlap with other unit pixels adjacent to the reference unit pixel out of the unit pixels.

2. The projector according to claim 1,
wherein one of four of the unit pixels, the four unit pixels diagonally disposed and forming two pairs that intersect with each other in the pixel region, is set as the reference unit pixel, and
the pixel shifting device superimposes the image light output from the reference unit pixel at the shifted display position on a region corresponding to a first portion of the black matrix and surrounded by corners of the four unit pixels at the reference display position.

3. The projector according to claim 1,
wherein the pixel shifting device
superimposes the image light output from the reference unit pixel at the second shifted display position on a region corresponding to a third portion of the black matrix and located at another side of the reference unit pixel at the reference display position.

4. The projector according to claim 1,
wherein the pixel shifting device has a single swing axis around which the pixel shifting device swings an optical path changer that changes the optical path of the image light.

5. The projector according to claim 4,
wherein the pixel shifting device superimposes the image light output from the reference unit pixel at the shifted display position on a region corresponding to a fourth portion of the black matrix and adjacent to an edge of the reference unit pixel at the reference display position.

6. The projector according to claim 5,
wherein the pixel shifting device shifts the optical path of the image light output from the light modulation panel to successively switch the optical path between a first shifted optical path that causes the shifted image light to be located at a first shifted display position on the projection receiving surface and a second shifted optical path that causes the shifted image light to be located at a second shifted display position on the projection receiving surface,
superimposes the image light output from the reference unit pixel at the first shifted display position on a region corresponding to a second portion of the black matrix and located at one side of the reference unit pixel at the reference display position, and
superimposes the image light output from the reference unit pixel at the second shifted display position on a region corresponding to a third portion of the black matrix and located at another side of the reference unit pixel at the reference display position.

7. The projector according to claim 4,
wherein the pixel shifting device superimposes the image light output from the reference unit pixel at the shifted display position on a region corresponding to a fifth portion of the black matrix and adjacent to a corner of the reference unit pixel at the reference display position.

8. The projector according to claim 1,
wherein the pixel shifting device has two swing axes around which the pixel shifting device swings an optical path changer that changes the optical path of the image light.

9. The projector according to claim 8,
wherein the pixel shifting device shifts the image light output from the reference unit pixel during the pixel shifting along a region corresponding to the black matrix and adjacent to two edges that sandwich a corner of the reference unit pixel at the reference display position.

10. The projector according to claim 9,
wherein the pixel shifting device shifts the image light output from the reference unit pixel during the pixel shifting along a region corresponding to the black matrix and adjacent to a plurality of corners of the reference unit pixel at the reference display position.

11. The projector according to claim 9,
wherein the pixel shifting device shifts the image light along a region corresponding to the black matrix and adjacent to four edges of the reference unit pixel during the pixel shifting.

* * * * *